United States Patent
Yamakawa

Patent Number: 6,014,462
Date of Patent: Jan. 11, 2000

[54] IMAGE PROCESSING APPARATUS AND METHOD FOR DISTINGUISHING ALPHANUMERIC SYMBOLS ON A WHITE BACKGROUND AND THOSE ON A MESH PATTERN AND INDIVIDUALLY PROCESSING SUCH IMAGE DATA

[75] Inventor: Shinji Yamakawa, Kawasaki, Japan

[73] Assignee: Ricoh Company, Ltd., Tokyo, Japan

[21] Appl. No.: 08/885,687

[22] Filed: Jun. 30, 1997

[30] Foreign Application Priority Data

Jul. 8, 1996 [JP] Japan ................................. 8-198322

[51] Int. Cl.$^7$ .............. G06K 9/00; G06K 9/34; G06K 9/48; H04N 1/38
[52] U.S. Cl. .............. 382/200; 382/165; 382/176; 382/199; 358/464
[58] Field of Search .............. 382/138, 165, 382/176, 199, 200; 358/464, 530, 517

[56] References Cited

U.S. PATENT DOCUMENTS 5,206,718  4/1993  Yamakawa ......................... 358/517

Primary Examiner—Phuoc Tran
Assistant Examiner—Daniel G. Mariam
Attorney, Agent, or Firm—Cooper & Dunham LLP

[57] ABSTRACT

An image processing apparatus that distinguishes between alphanumeric symbols on a white background and those on a mesh pattern and performs individual image data processing includes an analog-to-digital converter for converting analog data to digital data, a first determiner for determining a region as a white picture element region when the region is composed of a predetermined white picture element and a plurality of white picture elements surrounding the predetermined white picture element in the digital data, a conditional variant setter for setting a conditional variant to white picture elements in the white picture element region, a potential thin line extractor for extracting a potential thin line pattern using a black picture element that has been corrected after being extracted from the digital data and a white picture element that has been corrected after being extracted from the digital data, and a second determiner for determining which one of an alphanumeric symbol on a white background, an alphanumeric symbol on a mesh pattern, and a design pattern is similar to the potential thin line pattern based on the conditional variant and the potential thin line pattern extracted by the potential thin line extractor, and for renewing the conditional variant based on a determination result of the second determiner.

49 Claims, 12 Drawing Sheets

| $a_{00}$ | $a_{01}$ | $a_{02}$ | $a_{03}$ | $a_{04}$ | $a_{05}$ | $a_{06}$ |
|---|---|---|---|---|---|---|
| $a_{10}$ | $a_{11}$ | $a_{12}$ | $a_{13}$ | $a_{14}$ | $a_{15}$ | $a_{16}$ |
| $a_{20}$ | $a_{21}$ | $a_{22}$ | $a_{23}$ | $a_{24}$ | $a_{25}$ | $a_{26}$ |
| $a_{30}$ | $a_{31}$ | $a_{32}$ | $a_{33}$ | $a_{34}$ | $a_{35}$ | $a_{36}$ |
| $a_{40}$ | $a_{41}$ | $a_{42}$ | $a_{43}$ | $a_{44}$ | $a_{45}$ | $a_{46}$ |
| $a_{50}$ | $a_{51}$ | $a_{52}$ | $a_{53}$ | $a_{54}$ | $a_{55}$ | $a_{56}$ |
| $a_{60}$ | $a_{61}$ | $a_{62}$ | $a_{63}$ | $a_{64}$ | $a_{65}$ | $a_{66}$ |

… 
IMAGE PROCESSING APPARATUS AND METHOD FOR DISTINGUISHING ALPHANUMERIC SYMBOLS ON A WHITE BACKGROUND AND THOSE ON A MESH PATTERN AND INDIVIDUALLY PROCESSING SUCH IMAGE DATA

BACKGROUND OF THE INVENTION

1. Field of the Invention

This invention relates to a method and apparatus for image processing, and more particularly to a method and apparatus for image processing that distinguishes between alphanumeric symbols on a white background and those on a mesh pattern and performs individual image data processing.

2. Discussion of the Background

A recent trend in image processing is to have high performance capabilities and increased functional capabilities. Accordingly, many image processing apparatuses are now capable of performing high-definition image processing of input image data. To achieve a high-definition image processing performance, techniques for distinguishing between data of alphanumeric symbols and of a photograph are provided in the image processing apparatuses.

For example, an image reading apparatus disclosed in Japanese Laid Open Patent Application No. 03-63887 (1991) is capable of a high-definition image reproduction processing that distinguishes between alphanumeric symbols and photographs by judging differences in colors.

As another example, an image processing method disclosed in Japanese Laid Open Patent Application No. 01-137378 (1989) is capable of clearly reproducing a line image of an alphanumeric symbol with a clear edge in a binary form, and a halftone image such as a photograph using an artificial halftone in a binary form with a noise-reduced shape. This technique uses extracted density variations and selects different thresholds in accordance with the extracted density variations.

These conventional techniques improve image quality in reproduced images. However, these techniques are not capable of distinguishing between alphanumeric symbols on a white background, those on a mesh pattern, and design patterns. This is because the technique described in 03-63887 (1991) simply changes a threshold value of a Laplacian data unit, and the technique described in 01-137378 (1989) simply changes processing in accordance with color levels. Accordingly, these techniques are not capable of appropriately performing individual processing of alphanumeric symbols on a white background, those on a mesh pattern, and design patterns.

There is presently no image processing apparatus that is capable of distinguishing between alphanumeric symbols on a white background, those on a mesh pattern, and design patterns, and that appropriately performs individual processing of these different types of image data.

SUMMARY OF THE INVENTION

Accordingly, an object of the present invention is to provide a novel image processing apparatus that is capable of distinguishing between alphanumeric symbols on a white background, those on a mesh pattern, and design patterns, and that appropriately performs individual processing of these different types of image data in a simple and low cost structure.

To achieve the above-mentioned object, the novel image processing apparatus includes an analog-to-digital converter for converting analog data to digital data, a first determiner for determining a region as a white picture element region when the region is composed of a predetermined white picture element with a plurality of white picture elements surrounding the predetermined white picture element in the digital data, a conditional variant setter for setting a conditional variant to white picture elements in the white picture element region, a potential thin line extractor for extracting a potential thin line pattern using a black picture element that has been corrected after being extracted from the digital data and a white picture element that has been corrected after being extracted from the digital data, and a second determiner for determining whether an alphanumeric symbol on a white background, an alphanumeric symbol on a mesh pattern, or a design pattern is similar to the extracted potential thin line pattern based on the conditional variant and the potential thin line pattern extracted by the potential thin line extractor, and renewing the conditional variant in accordance with a determination result of the second determiner.

In the above-mentioned novel image processing apparatus, a second conditional variant setter may be used for setting the conditional variant when a black alphanumeric symbol on a white background is extracted.

Further, in the above-mentioned novel image processing apparatus, the potential thin line extractor may be used to extracts the potential thin line pattern using extraction conditions differentiated in accordance with the conditional variant.

Still further, in the above-mentioned novel image processing apparatus, the first determiner may be used to perform an image scanning operation in predetermined directions such that the conditional variant moves in directions towards coordinates $P(i, j+1)$, $P(i+1, j)$, and $P(i+1, j-1)$ relative to a target processing picture element having coordinates $P(i, j)$.

Yet further, in the above-mentioned novel image processing apparatus, the potential thin line extractor may be used to corrects the black picture element and the white picture element using Laplacian data, and may vary extraction weights of the Laplacian data on the basis of at least one of a scanning speed and a magnification ratio.

Other objects, features, and advantages of the present invention will become apparent from the following detailed description when read in conjunction with the accompanying drawings.

This application is based on Japanese Patent application JPAP08-198322 filed on Jul. 8, 1996. The entire contents of the Japanese application is hereby incorporated by reference.

BRIEF DESCRIPTION OF THE DRAWINGS

A more complete appreciation and understanding of the present invention and many of the attendant advantages thereof will be readily obtained by reference to the following detailed description when considered in connection with the accompanying drawings, wherein.

DESCRIPTION OF THE PREFERRED EMBODIMENTS

Figure 1:
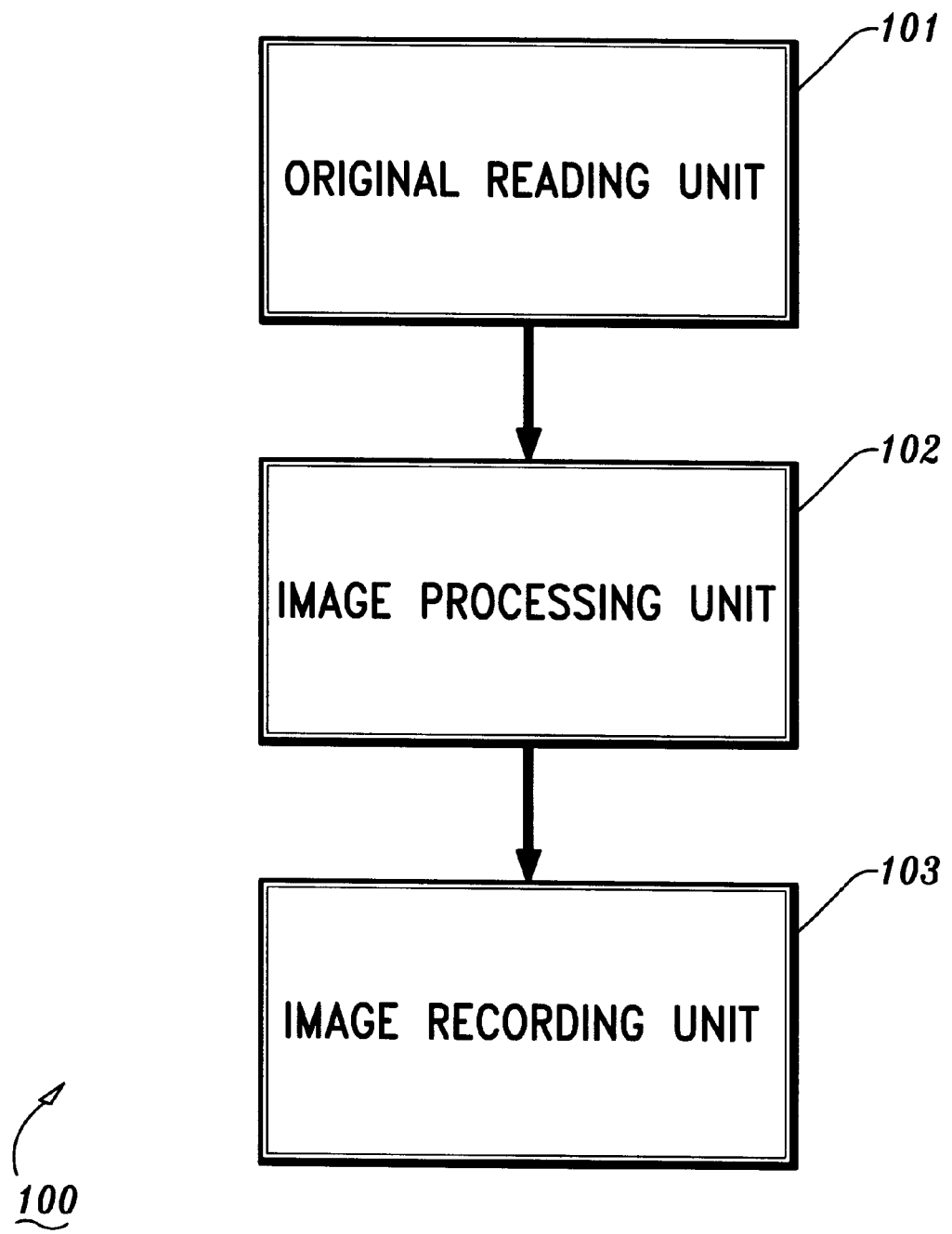
FIG. 1 is a schematic block diagram of a novel image processing apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

With respect to the drawings, like reference numerals designate identical or corresponding parts throughout the various views.

FIG. 1 is a schematic block diagram of an image processing apparatus 100 according to an embodiment of the present invention. The image processing apparatus 100 includes an original reading unit 101 for reading analog image data from an original image and outputting digital image data after converting the analog image data into a digital signal. The image processing apparatus 100 further includes an image processing unit 102 for providing various corrective processing to the digital image data from the original reading unit 101 and also for performing original recognition operations such as a line image recognition operation, a color judgment operation, and so forth. The image processing apparatus 100 also includes an image recording unit 103 for recording an image on a recording sheet in accordance with image data output from the image processing unit 102.

It is assumed that an operation of the novel image processing apparatus 100 herein described includes the following steps: the original reading unit 101 reads three-color image data (hereinafter referred to as RGB data) including red (R), green (G), and blue (B) colors; then the image processing unit 102 performs a color conversion in which the RGB data is converted into four-color image data (hereinafter referred to as CMYBk data) including cyan (C), magenta (M), yellow (Y), and black (Bk); and then the image recording unit 103 records a color image onto a recording sheet in accordance with the CMYBk data.

Figure 2:
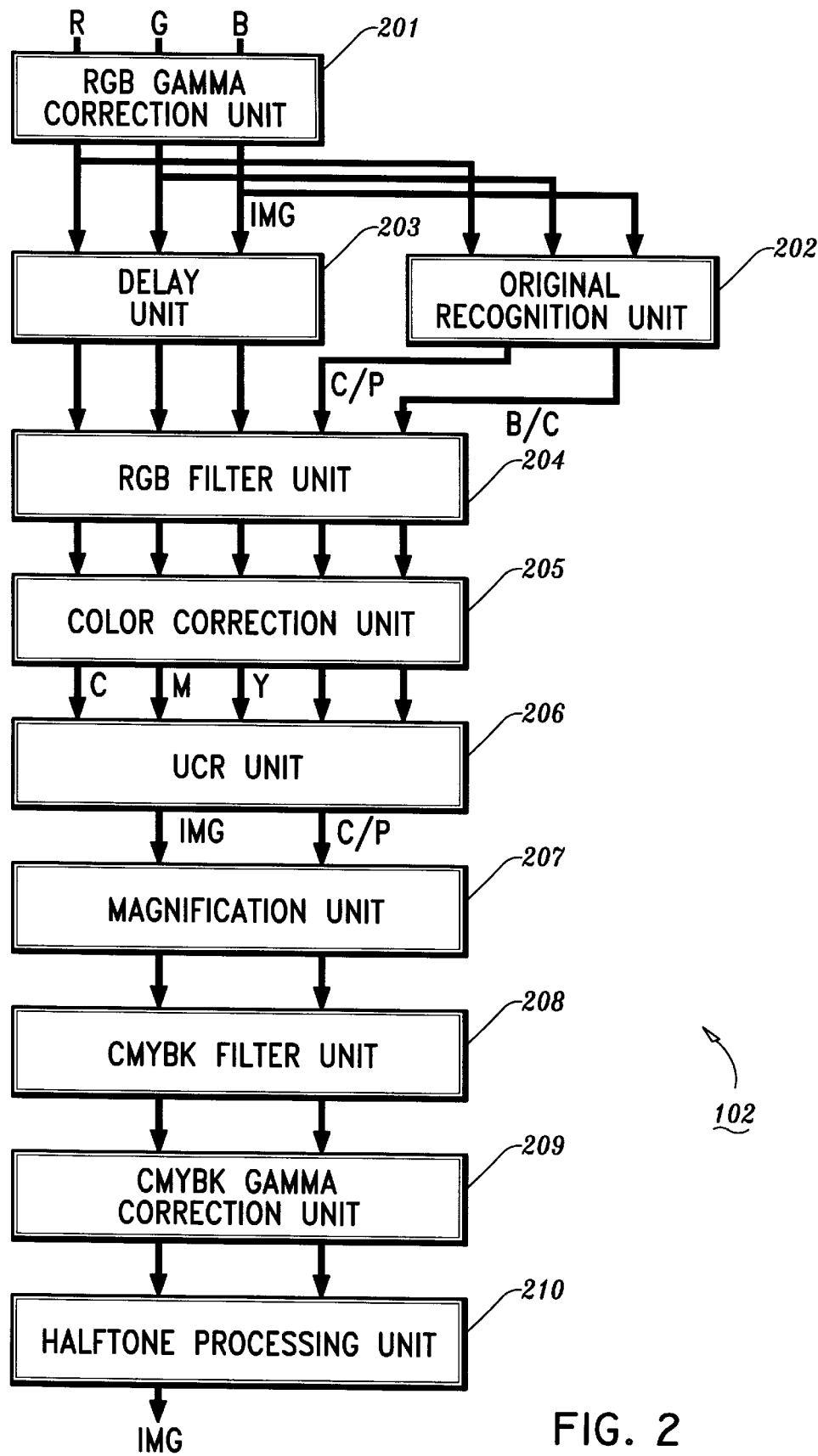
FIG. 2 is a detailed block diagram of the novel image processing apparatus shown in FIG. 1.

Details of the image processing unit 102 are explained with reference to the block diagram shown in FIG. 2. As shown in FIG. 2, the image processing unit 102 includes the following units. An RGB gamma correction unit 201 receives RGB data from the original reading unit 101, corrects a gray-balance of the RGB data, and converts reflection ratio data in the RGB data into darkness data. An original recognition unit 202 determines regions of alphanumeric symbols and patterns in the image in accordance with the RGB data from the RGB gamma correction unit 201 in order to output a C/P signal and also determines regions of chroma and non-chroma in the image in accordance with the RGB data in order to output a B/C signal. A delay unit 203 delays the RGB data in order to synchronize the RGB data with the outputs from the original recognition unit 202. An RGB filter unit 204 performs a MTF (modulation transfer function) correction to the RGB data from the delay unit 203. A color correction unit 205 converts the filtered RGB data from the RGB filter unit 204 into CMY data including C, M, and Y colors using a primary masking technique or the like. A UCR unit 206 performs a UCR (under color removal) operation, for removing a background color, on the CMY data to generate Bk data. A magnification unit 207 performs an operation of image enlargement or reduction, or preserves an original image size in a main scanning direction on output from the UCR unit 206. A CMYBk filter unit 208 performs operations of smoothing and sharpening on output from the magnification unit 207. A CMYBk gamma correction unit 209 performs a gamma correction on output from the CMYBk filter unit 208 in accordance with a frequency characteristic of the image recording unit 103. A halftone processing unit 210 performs quantization operations such as dither-matrix and error diffusion processings on the gamma-corrected output.

The C/P signal output from the original recognition unit 202 is a two-bit signal and represents image regions of, for example, alphanumeric symbols by 3, alphanumeric symbols on patterns by 1, and patterns by 0. In addition, the C/P signal is cascaded to the RGB filter unit 204, the color correction unit 205, the UCR unit 206, the magnification unit 207, the CMYBk filter unit 208, the CMYBk correction unit 209, and the halftone processing unit 210. The halftone processing unit 210 can thereby generate an IMG signal in synchronism with the image data.

The B/C signal is a one-bit signal and represents image regions of, for example, non-chroma by a high (H) signal and chroma by a low (L) signal. In addition, the B/C signal is cascaded to the RGB filter unit 204, the color correction unit 205, and the UCR unit 206, and is output in synchronism with the image data.

The RGB filter 204 performs MTF (modulation transfer function) filtering of the RGB data and has a structure of an N×M matrix. The function of MTF filtering varies according to the C/P signal. For example, the image data receives sharpening processing when the C/P signal is 3, smoothing processing when the C/P signal is 0, and neither sharpening nor smoothing processing when the C/P signal is 1.

The UCR unit 206 improves reproduction of colors. The UCR unit 206 performs UCR processing on a common data portion of the CMY data from the color correction unit 205 using a color adding operation. As a result of UCR processing, the UCR unit 206 generates Bk data. The UCR unit 206 outputs the Bk data in a form of skeleton black when the C/P signal is other than 3 and in a form of full black when the C/P signal is 3. In addition, the UCR unit 206 erases all of the C, M, and Y data when the C/P signal is 3 and the B/C signal is H. This is because a black alphanumeric symbol is necessarily formed in black. Also, an IMG signal is output from the UCR unit 206 and represents one of the C, M, Y, and Bk colors at each output occurrence. Accordingly, generation of full color (four colors) data requires four IMG signal outputs, and four original reading operations are required.

The CMYBk filter unit 208 performs smoothing and sharpening operations using an N×N space filter in accordance with a frequency characteristic of the image recording unit 103 and a value of the C/P signal.

The CMYBk gamma correction unit 209 performs a gamma curve change operation in accordance with a frequency characteristic of the image recording unit 103 and a value of the C/P signal. For example, a gamma curve for faithfully reproducing an image is used when the C/P signal is 0 and a raised gamma curve for emphasizing contrast is used when the C/P signal is other than 0.

The halftone processing unit 210 performs quantization operations, such as dither processing and so on, in accordance with a frequency characteristic of the image recording unit 103 and a value of the C/P signal. A halftone weighted quantization operation is used when the C/P signal is 0 and an image resolution weighted quantization operation is used when the C/P signal is other than 0.

In the above-mentioned configuration of the image processing unit 102, the C/P signal is 0 when patterns are processed. Accordingly, the RGB filter unit 204 performs the smoothing operation, the UCR unit 206 performs the skeleton black operation, the CMYBk gamma correction unit 209 selects a curve for faithfully reproducing an image, and the CMYBk filter unit 208 and the halftone processing unit 210 perform the halftone weighted operations.

When alphanumeric symbols are processed, the C/P signal is 3 in the above-mentioned configuration of the image processing unit 102. Accordingly, the RGB filter unit 204 performs sharpening processing, the UCR unit 206 performs the full black operation, the CMYBk gamma correction unit 209 selects a curve for emphasizing contrast, the CMYBk filter unit 208 and the halftone processing unit 210 perform the image resolution weighted operations.

Further, when alphanumeric symbols in black are processed, the C/P signal is 3 and the B/C signal is H in the above-mentioned configuration of the image processing-unit 102. In this case, only Bk data is recorded and other data of C, M, Y are not recorded. This is to prevent colors from depositing around the black alphanumeric symbols due to possible positioning errors. In addition, the Bk data may be processed to have strong contrast by using a contrast weighted RGB filter.

Still further, when patterns are processed, the C/P signal is 1 in the above-mentioned configuration of the image processing unit 102. Accordingly, the RGB filter unit 204 performs either slight-emphasizing processing or through-processing for outputting input data as they are, the UCR unit 206 performs the full black operation, the CMYBk gamma correction unit 209 selects a contrast weighted curve, and the CMYBk filter 208 and the halftone processing unit 210 perform the image resolution weighted operations.

In this way, the image processing unit 102 can perform three different processings for patterns, edges of alphanumeric symbols, and alphanumeric symbols of patterns.

Next, a configuration of the original recognition unit 202 is explained with reference to the block diagram shown in FIG. 3. The original recognition unit 202 is composed of a line image recognition unit 301 for recognizing line images and a color determination unit 302 for determining whether a specific region of the original image is in chroma or non-chroma. The following operation is made with the assumption that a reading resolution of the original reading unit 101 is 400 dpi (dot per inch), for example.

The line image recognition unit 301 outputs the C/P signal. A value of the C/P signal is, for example, 3 when the image data is recognized as edges of a line image, 1 when the image data is recognized as edges of a line image on a pattern, or 0 in other cases.

Figure 3:
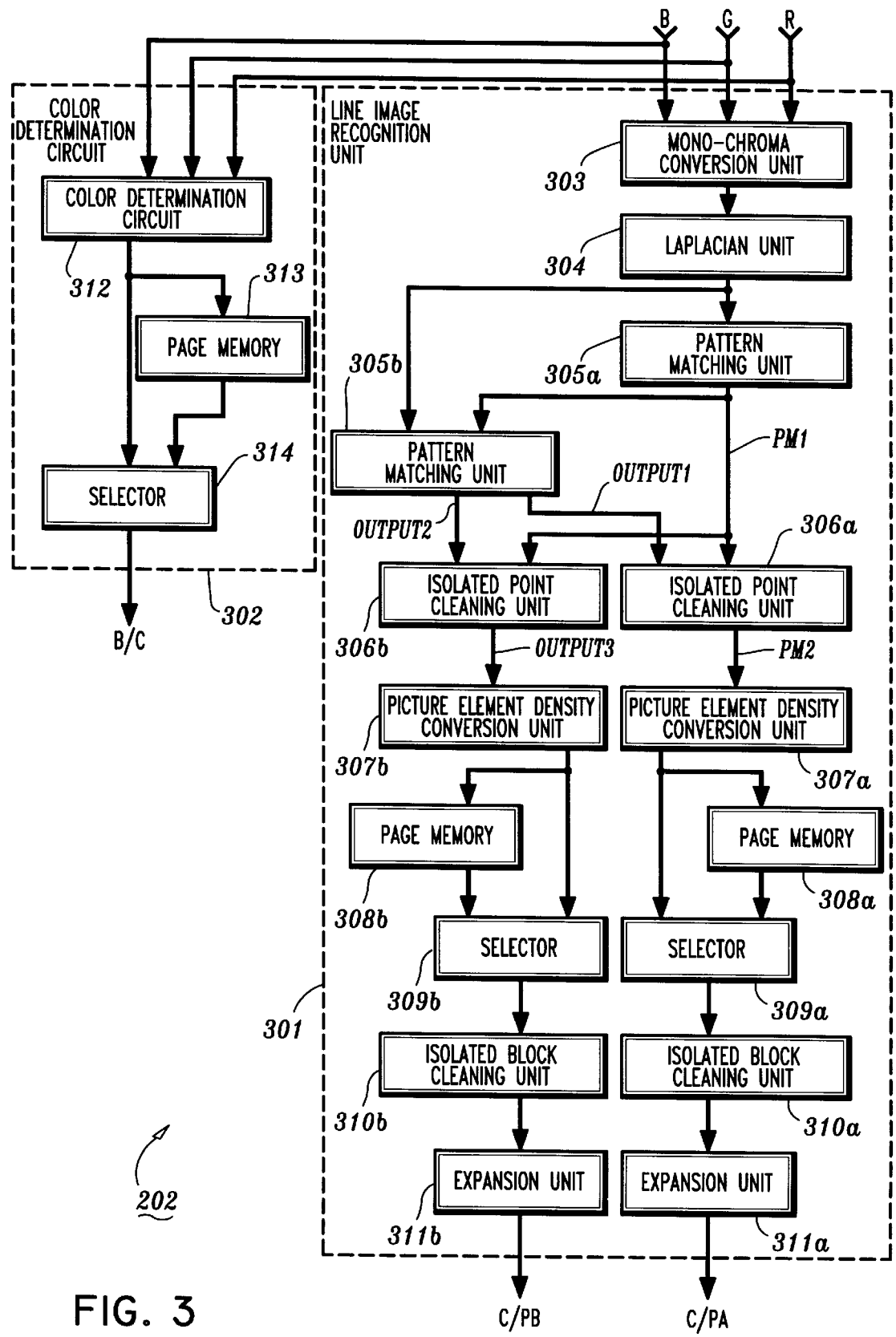
FIG. 3 is a detailed block diagram of an original reading unit of the novel image processing apparatus shown in FIG. 1.

As shown in FIG. 3, the line image recognition unit 301 includes a mono-chroma conversion unit 303, a Laplacian unit 304, pattern matching units 305A and 305B, isolated point cleaning units 306A and 306B, picture element density conversion units 307A and 307B, page memories 308A and 308B, selectors 309A and 309B, isolated block cleaning units 310A and 310B, and expansion units 311A and 311B. The line image recognition unit 301 outputs C/PA and C/PB, the sum of which is referred to as the C/P signal. The C/P signal is 0 when C/PA and C/PB are both L, 1 when C/PA and C/PB are L and H, respectively, and 3 when C/PA and C/PB are both H.

Also, as shown in FIG. 3, the color determination unit 302 includes a color determination circuit 312, a page memory 313, and a selector 314. The color determination unit 302 outputs the B/C signal. A value of the B/C signal is low (L) when the image data is determined to be for a chroma region, and high (H) when the image data is determined to be for a non-chroma region. An output of the B/C signal represents a block of 4×4 picture elements corresponding to one picture element. In the following explanation, a block is used as a unit of the B/C signal output.

Next, a detailed operation of the line image recognition unit 301 is explained with reference to the block diagram shown in FIG. 3. The RGB data input into the line image recognition unit 301 is converted into brightness data and then to a mono-chroma signal by the mono-chroma conversion unit 301. The darkest data among the RGB data may be selected and converted into a mono-chroma signal, or the G data may be selected and used as a mono-chroma signal. In any case, the data output from the mono-chroma conversion unit 303 represents increasing darkness with an increasing value and decreasing darkness with a decreasing value.

The Laplacian unit 304 extracts edges from the line image and, at the same time, detects both white and black regions. By detecting a white region, the Laplacian unit 304 determines extraction data for the line image on a white background, which is treated as a candidate for a thin line image.

An operation of detecting a white region by the Laplacian unit 304 is now explained with reference to the matrix table of FIG. 4 for representing picture elements with examples of symbolized codes $a_{nm}$.

When a white region is represented by 3×3 picture elements in the matrix, detection of a white region can be achieved by comparing values of $a_{nm}$ and a threshold level for a white color, abbreviated as thw, as shown in the following example:

$((a_{00}<thw)$ and $(a_{01}<thw)$ and $(a_{02}<thw)$ and $(a_{10}<thw)$ and $(a_{11}<thw)$ and $(a_{12}<thw))$, or $((a_{10}<thw)$ and $(a_{11}<thw)$ and $(a_{12}<thw)$ and $(a_{20}<thw)$ and $(a_{21}<thw)$ and $(a_{22}<thw))$, or $((a_{00}<thw)$ and $(a_{10}<thw)$ and $(a_{20}<thw)$ and $(a_{01}<thw)$ and $(a_{11}<thw)$ and $(a_{21}<thw))$, or $((a_{01}<thw)$ and $(a_{11}<thw)$ and $(a_{21}<thw)$ and $(a_{02}<thw)$ and $(a_{12}<thw)$ and $(a_{22}<thw))$.

When data for a focus picture element and surrounding picture elements in a region are less than that for thw, the region is determined as a candidate for a white region. In this way, a plurality of threshold levels for the white color can be implemented. For example, a threshold level for a plain white is set for a candidate for a thick line image and another lower threshold level, which means the threshold level is whiter, is set for a candidate for a thin line image. The reason for setting the threshold level to be whiter for a candidate for a thin line image is to avoid the occurrence of a bright part in patterns such as mesh patterns made of small dots in printing materials and in the finest printable lines used in a copying machine from being a candidate for a white region.

Although the pattern described above is an example of patterns including orthogonal picture elements in horizontal and vertical directions, other patterns including orthogonal picture elements in diagonal directions may be extracted as well.

Then, a Laplacian $x_3$ can be determined using the following equations to distinguish a white region from a candidate for a white region as determined through the above-mentioned procedure:

$$x_1=(a_{22}\times 2)-(a_{21}+a_{23})\times i$$

$$x_2=((a_{22}\times 4)-(a_{11}+a_{13}+a_{31}+a_{33}))\times i/2+x_1$$

$$x_3=(a_{22}\times 2)-(a_{12}+a_{32})+x_2.$$

In the equations, i represents a difference in the MTF (modulation transfer function) between the main scanning and the sub-scanning or a weight coefficient of magnification used during a magnification operation. When x satisfies the inequality $(x-N)<x_3<(x+N)$, the region is determined as a white region. In this case, the threshold level for the white color may be set differently for thick and thin line images, or, alternatively, one threshold level may be used for both thick and thin line images.

In this way, white regions for thick and thin line images are determined. Thereby, bright parts in patterns such as mesh patterns made of small dots in printing materials and in the finest printable lines used in a copying machine are disregarded so that these patterns can be prevented from being wrongly extracted.

In some cases, correcting a white region for a thick line image may be necessary. For example, when white alphanumeric symbols printed on a black background are read by an optical reading apparatus such as a copying machine, white data may be erroneously read as data having more on the black side due to a flare phenomenon. To correct this error caused by the flare phenomenon, the following correction, for example, may be used for a 3×3 matrix:

$((a_{00}<thw)$ and $(a_{01}<thw)$ and $(a_{02}<thw)$ and $(a_{10}<thw)$ and $(a_{11}<thw)$ and $(a_{12}<thw)$ and $(a_{20}<thw)$ and $(a_{21}<thw)$ and $(a_{22}<thw))$.

A candidate for a corrected white region is determined when the above conditions are satisfied. Then, the candidate for a corrected white region is examined to determine if it is indeed a corrected white region, by using the above-mentioned Laplacian. As a result, a corrected white region is extracted and determined. In this case, thw is given a value more on the black side and N is given a value smaller than that of a white region for a thick line image. The reason giving the smaller value of N is to extract stable white data which has less variation. Then, the result of extraction of the above-mentioned corrected white region is correlated to the corrected white region for a thick line image. Therefore, the corrected white region and the corrected white region for a thick line image are treated as the corrected white region for a thick line image. As described earlier, bright parts in patterns such as mesh patterns made of small dots in printing materials and in the finest printable lines used in a copying machine are disregarded so that these patterns can be prevented from being wrongly extracted.

Then, line image data of a black region is extracted by detecting a black region. An operation of detecting the black region is explained with reference to the matrix table with the symbolized values, $a_{nm}$, as shown in FIG. 4. When a black region is represented by 3×3 picture elements in the matrix, detection of a black region can be achieved by comparing values of $a_{nm}$ and a threshold level for a black color, abbreviated as thb, as shown in the following example:

$((a_{00}<thb)$ and $(a_{01}<thb)$ and $(a_{02}<thb)$ and $(a_{10}<thb)$ and $(a_{11}<thb)$ and $(a_{12}<thb))$, or $((a_{10}<thb)$ and $(a_{11}<thb)$ and $(a_{12}<thb)$ and $(a_{20}<thb)$ and $(a_{21}<thb)$ and $(a_{22}<thb))$, or $((a_{00}<thb)$ and $(a_{10}<thb)$ and $(a_{20}<thb)$ and $(a_{01}<thb)$ and $(a_{11}<thb)$ and $(a_{21}<thb))$, or $((a_{01}<thb)$ and $(a_{11}<thb)$ and $(a_{21}<thb)$ and $(a_{02}<thb)$ and, $(a_{12}<thb)$ and $(a_{22}<thb))$.

When data for a focus picture element and surrounding picture elements in a region are less than that for thb, the region is determined as a candidate for a black region. A threshold level for the black color may be set to a plain black that contains enough black density to express alphanumeric symbols. Although the pattern shown above is an example of patterns including orthogonal picture elements in horizontal and vertical directions, other patterns including orthogonal picture elements in diagonal directions may be extracted as well.

Then, a Laplacian $x_3$ may be determined using the following equations to distinguish a black region from a candidate for a black region as determined through the above-mentioned procedure:

$$x_1=(a_{22}\times 2)-(a_{21}+a_{23})\times i$$

$$x_2=((a_{22}\times 4)-(a_{11}+a_{13}+a_{31}+a_{33}))\times i/2+x_1$$

$$x_3=(a_{22}\times 2)-(a_{12}+a_{32})+x_2.$$

In the equations, i represents a difference in the MTF (modulation transfer function) between the main scanning and the sub-scanning or a weight coefficient of magnification used during a magnification operation. When $x_3$ satisfies the inequality $(x-N)<x_3<(x+N)$, the region is determined as a black region. Thereby, dark parts in patterns such as mesh patterns made of small dots in printing materials and in the finest printable lines used in a copying machine are disregarded so that these patterns can be prevented from being wrongly extracted.

An edge amount $x_3$ can be determined using the following equations:

$$x_1=(a_{22}\times 2)-(a_{21}+a_{23})\times i$$

$$x_2=((a_{22}\times 4)-(a_{11}+a_{13}+a_{31}+a_{33}))\times i/2+x_1$$

$$x_3=(a_{22}\times 2)-(a_{12}+a_{32})+x_2.$$

In these equations, i is a coefficient that is selected when designing hardware for the image processing apparatus 100 so that gates can be made as small as possible. The value of i is selected from values such as 1.1, 1.125, 1.25, 1.375, 1.5, 1.625, 1.75, 1.875, 2, which are determined by fixed-decimal-point arithmetic. Thereby, an image that is out of focus due to the MTF of the main scanning and the sub-scanning can be corrected.

In general, the MTF of the main scanning and that of the sub-scanning are different. In particular, magnification in the sub-scanning direction is made by varying a reading speed of an area. Accordingly, the MTF differs by the magnification ratio in the sub-scanning direction. However, this is not the case for this embodiment of the present invention because the magnification in the main scanning, which is controlled by the magnification unit 207, is located after the original recognition unit 202, as shown in FIG. 2. In addition, when the magnification ratio is set to a large value such as 200%, for example, the matrix table of FIG. 4 is arranged so that the edge amount $x_3$ can be determined using the following equations:

$$x_1 = (a_{22} \times 2) - (a_{21} + a_{23}) \times i$$

$$x_2 = ((a_{22} \times 4) - (a_{11} + a_{13} + a_{31} + a_{33})) \times i/2 + x_1$$

$$x_3 = (a_{22} \times 2) - (a_{12} + a_{32}) + x_2.$$

In this way, the line image recognition unit 301 can properly perform its function when magnification is made in the sub-scanning direction and the MTF in the sub-scanning direction is changed.

The Laplacian unit 304, shown in FIG. 3, detects the white and black regions, as explained hereinbefore, and outputs white and black region signals. As also explained, the Laplacian unit 304 outputs the edge amounts of a line image. The white region signal of thick and thin line images represents white regions by a signal level H (high), and the black region signal represents black regions by a signal level L (low).

Figures 4, 5:
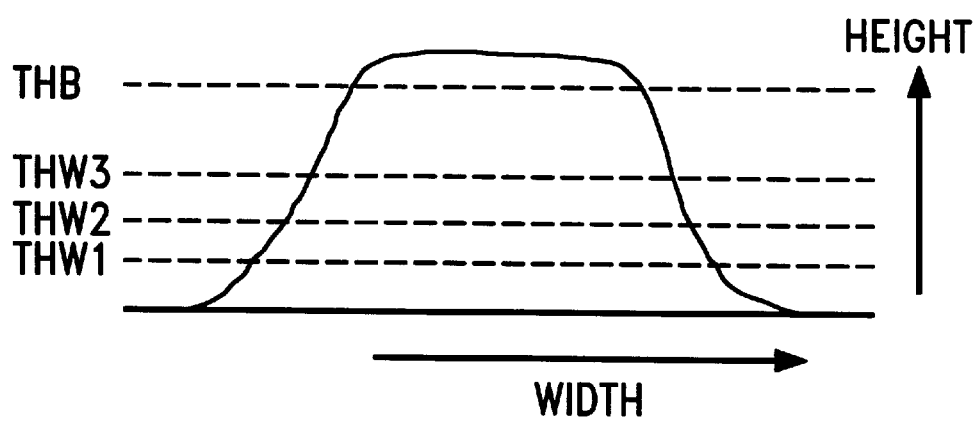
FIG. 4 is a matrix table for explaining operations for detecting white and black regions by a Laplacian unit of a line recognition unit in the original reading unit shown on FIG. 3.
FIG. 5 is an illustration for conceptually showing relationships between-white and black regions and their thresholds.

A relation between the white and black regions and threshold level is conceptually shown in FIG. 5. In FIG. 5, thb, thw1, thw2, and thw3 represent a threshold level for a black region, a threshold level for a thin line image in a white region, a threshold level for a thick line image in a white region, and a threshold level for a correction to a white region, respectively.

Figures 6, 7:
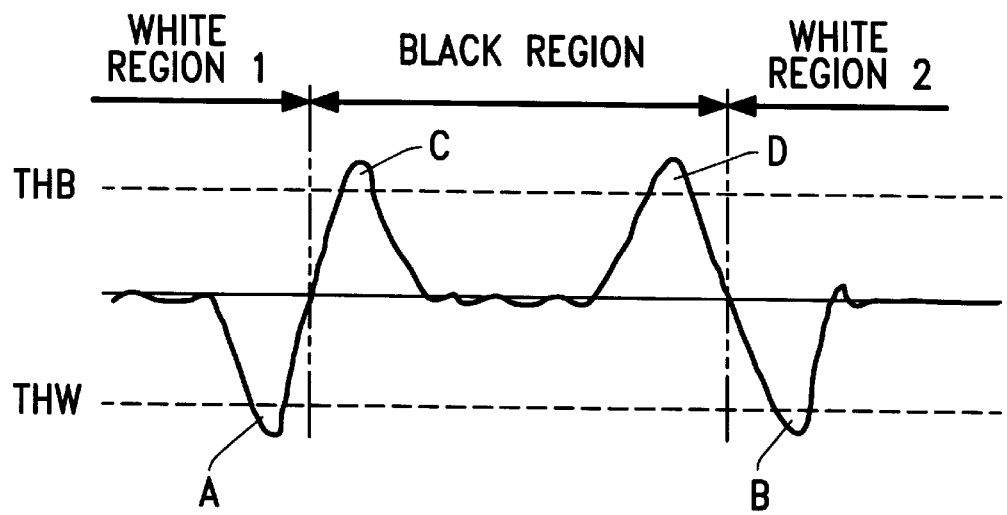
FIG. 6 is an illustration for showing relationships between thresholds of white and black regions and edge amounts.
FIG. 7 is an illustration for explaining focus picture elements in a pattern matching operation.

An edge amount x of line image is conceptually illustrated in FIG. 6. In FIG. 6, areas indicated by A and B are edge amounts of the respective white regions 1 and 2, and areas indicated by C and D are edge amounts of the black region which is a black line image.

Next, a pattern matching operation by the pattern matching units 305A and 305B in the line image recognition unit 301 are explained, as shown in FIG. 3. The pattern matching unit 305A performs a pattern matching operation to extract a white region from a black region by matching patterns. In the operation of the pattern matching unit 305A, a white region pattern w is defined as a signal of a thick line image in a corrected white region and a black region pattern k is defined as a signal of a black region, for example. An exemplary matching pattern in a 7×7 picture-element matrix table is shown below:

($k_{12}$ and $k_{13}$ and $k_{14}$ and $k_{22}$ and $k_{23}$ and $k_{24}$ and $k_{32}$ and $k_{33}$ and $k_{34}$ and (($w_{52}$ and $w_{53}$ and $w_{54}$) or ($w_{62}$ and $w_{63}$ and $w_{64}$) or ($w_{12}$ and $w_{13}$ and $w_{14}$) or ($w_{02}$ and $w_{03}$ and $w_{04}$))), or ($k_{21}$ and $k_{31}$ and $k_{41}$ and $k_{22}$ and $k_{32}$ and $k_{42}$ and $k_{23}$ and $k_{33}$ and $k_{43}$ and (($w_{25}$ and $w_{35}$ and $w_{45}$) or ($w_{26}$ and $w_{36}$ and $w_{46}$) or ($w_{21}$, and $w_{31}$, and $w_{41}$) or ($w_{20}$ and $w_{30}$ and $w_{40}$))).

Although the pattern shown above is an example of patterns including orthogonal picture elements in horizontal and vertical directions, other patterns including orthogonal picture elements in diagonal directions may be extracted as well. In this way, the pattern matching unit 305A extracts a white region from a black region. By the thus-arranged pattern matching operation, a line image on a black region can be extracted without mistakenly recognizing a mesh pattern as a line image when a larger number of black regions exist.

By using a size relationship between a black region, a corrected white region for a thick line image, and a white region for a thin line image, these regions may preferably be represented by specific codes. As an exemplary coding in the following explanation, a black region, a corrected white region for a thick line image, white region for a thin line image are defined as B, W1, and W2, respectively. Then, the coding is arranged in the following manner, for example: when B is recognized, code 1 is set; when W2 is recognized, code 2 is set; when W1 is recognized and W2 is not recognized, code 3 is set; and when none of B, W1 and W2 are recognized, code 0 is set. Codes used in this case range from 0 to 3, which can be expressed by two-bit data. In this case, three-bit x n-line sized data can accordingly be shrunk into two-bit x n-line sized data by the above-mentioned coding. In addition, the size relationship mentioned above may be altered from time to time on a demand basis.

A plurality of focus picture elements are specified by coordinates $P_{(i, j)}$ in the main scanning and sub-scanning directions of an image as indicated in the matrix table shown in FIG. 7, for example.

Figure 8:
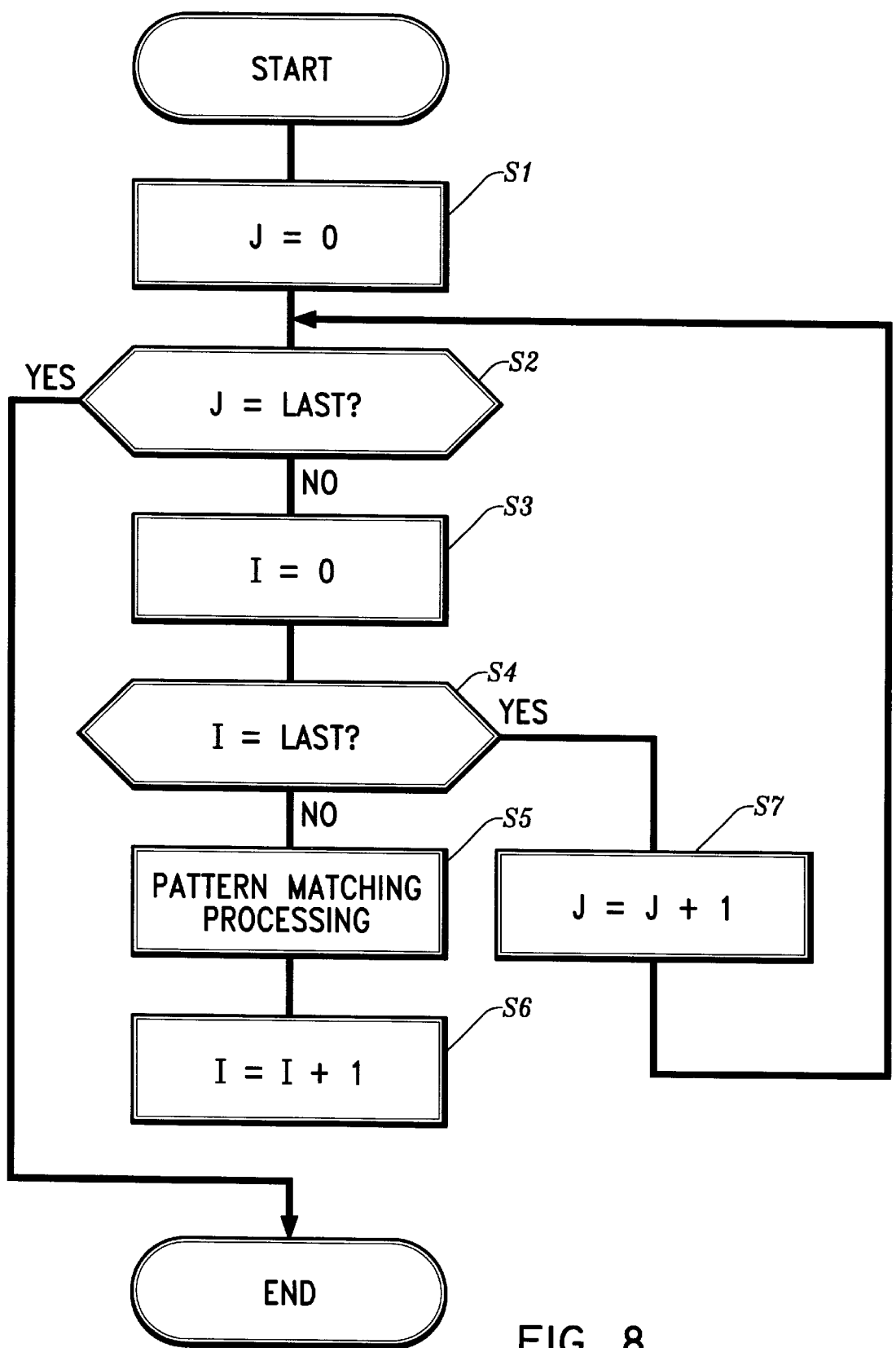
FIGS. 8–10 are flowcharts for explaining the pattern matching operation.
Figure 9:
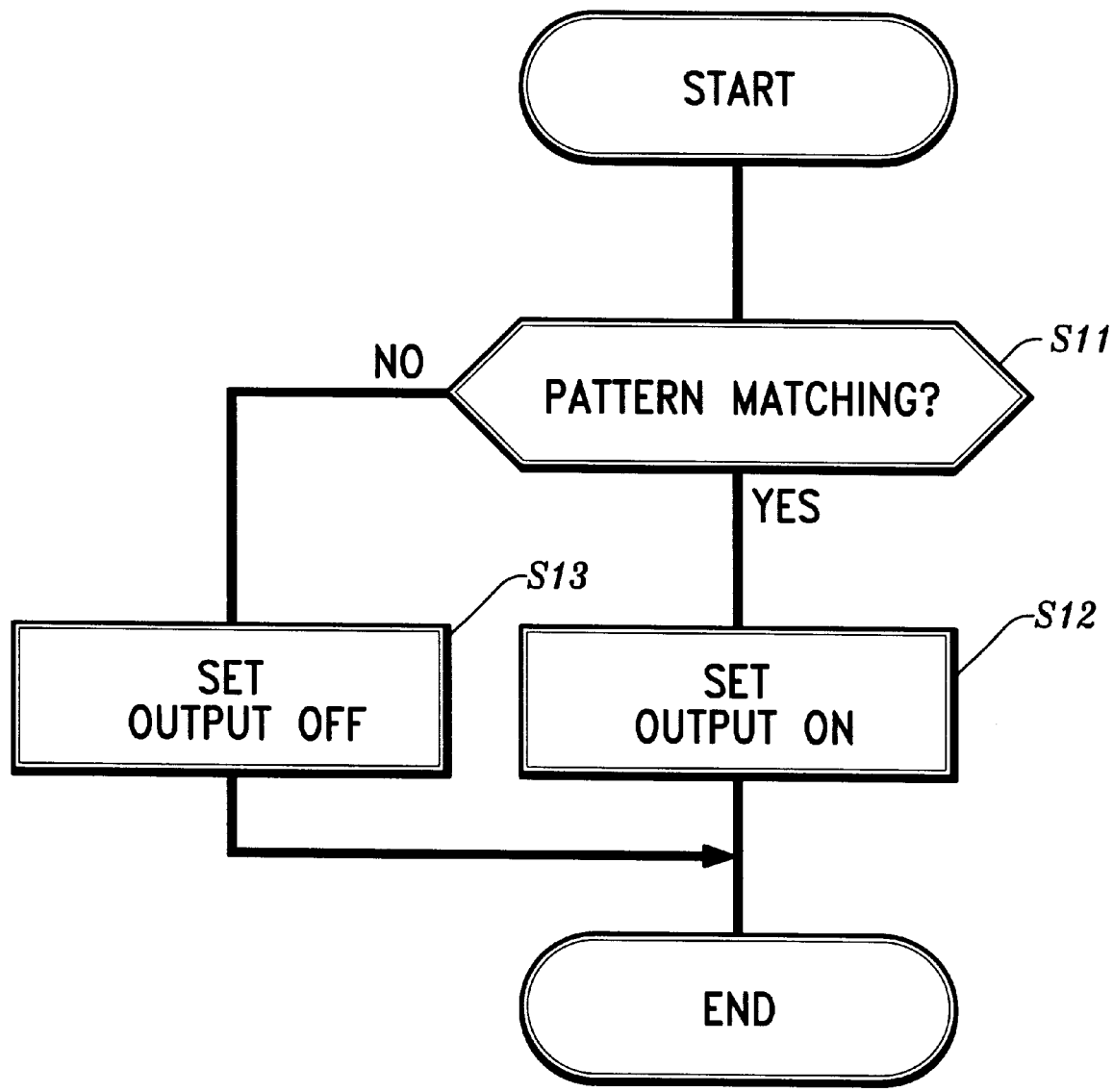

The pattern matching units 305A and 305B each performs a pattern matching operation on each set of coordinates $F_{(i, j)}$ in the matrix table of FIG. 7 through procedures indicated in the respective flowcharts of FIGS. 8 and 9.

First, a scanning operation in the ma in scanning and Sub-scanning directions for scanning each one of the plurality of the focus picture elements in the image shown in FIG. 7 is explained with reference to FIG. 8. Each Picture element has a set of coordinates $P_{(i, j)}$.

In step S1 of FIG. 8, j is set to 0. Then, in step S2, the pattern matching units 305A and 305B determines whether j 0 is the last scan. If j is the last scan the result of step S2 is YES, and the pattern matching units 305A and 305B each ends operation. If j is not the last scan the result of step S2 is NO, and the pattern matching units 305A and 305B each proceeds to step S3 and sets i to 0.

Then, in next step S4, the pattern matching units 305A and 305B each determines whether i is the last scan. if i is determined not to be the last scan the result of step S4 is NO, and the pattern matching units 305A and 305B each performs the pattern matching operation in step S5. Subsequently, i is incremented by one in step S6. Then, the pattern matching units 305A and 305B each returns to step S4 to repeat the same procedure until i is determined to be the last scan and the result of step S4 is YES. If the result of step S4 is YES, the pattern matching units 305A and 305B each proceeds to Step S7 and j is incremented by one.

Then, the pattern matching units 305A and 305B each returns to step S2 and determines whether j is the last scan. In this way, the pattern matching units 305A and 305B each performs the pattern matching operation on each of the plurality of focus picture elements shown in FIG. 7.

Second, the pattern matching in the flowchart shown in FIG. 8 is explained with reference to the flowchart of FIG. 9.

In step S1, each of the pattern matching units 305A and 305B determines whether each focus picture element is matched with the above-mentioned exemplary matching patterns using coding. If a focus picture element is matched with the matching patterns and the result of step S11 is YES, each of the pattern matching units 305A and 305B proceeds to step S12 and outputs PM1 (FIG. 3) at a high (H) level. Then, the procedure ends. If the focus picture element is not matched with the matching patterns and the result of step S11 is NO, each of the pattern matching units 305A and 305B proceeds to steps 13 and outputs PM1 (FIG. 3) at a low (L) level. Then, the procedure ends.

The pattern matching unit 305A performs an extraction operation on a thick part of a line image through the above-mentioned procedure. As a counter part, the pattern matching unit 305B performs an extraction operation on a thin line image through the above-mentioned procedure.

The thin line image may be defined as alphanumeric symbols and line images composed of lines thinner than 1 mm. In the operation, PM1 is raised to H when a black region or an edge amount is determined to be greater than the threshold level thb (FIG. 6) by using the black region pattern k. In a similar manner, PM1 is also raised to H when a white region for a thin line image or an edge amount is determined to be smaller than the threshold level thw (FIG. 6) by using the white region pattern w. In addition, a correction of the white region using an edge amount improves contrast on a thin line image. The level of correction may be adjusted by various factors, such as magnification; kinds of originals, such as color, white, or black; photography by printing; photography of print; copying originals, maps, and so forth; an adjustment key; and so on.

An exemplary matching pattern for a thin line image in a 7×7 picture-element matrix table is shown below:

$((w_{22}$ and $w_{23}$ and $w_{24})$ or $(w_{02}$ and $w_{03}$ and $w_{04}))$ and $w_{12}$ and $w_{13}$ and $w_{14}$ and $k_{32}$ and $k_{33}$ and $k_{34}$ and $w_{52}$ and $w_{53}$ and $w_{54}$ and $(w_{42}$ and $w_{43}$ and $w_{44})$ or $(w_{62}$ and $w_{63}$ and $w_{64}))$, or $((w_{22}$ and $w_{32}$ and $w_{42})$ or $(w_{20}$ and $w_{30}$ and $w_{40}))$ and $w_{21}$, and $w_{31}$ and $w_{41}$ and $k_{23}$ and $k_{33}$ and $k_{43}$ and $w_{25}$ and $w_{35}$ and $w_{45}$ and $(w_{24}$ and $w_{34}$ and $w_{44})$ or $(w_{26}$ and $w_{36}$ and $w_{46}))$, or $((w_{21}$ and $w_{31}$ and $w_{41})$ or $(w_{20}$ and $w_{30}$ and $w_{40}))$ and $w_{23}$ and $w_{33}$ and $w_{43}$ and $((k_{22}$ and $k_{32}$ and $w_{42})$ or $(k_{24}$ and $k_{34}$ and $k_{44}))$ and $(w_{25}$ and $w_{35}$ and $w_{45})$ or $(w_{26}$ and $w_{36}$ and $w_{46}))$.

Although the pattern shown above is an example of patterns including orthogonal picture elements in horizontal and vertical directions, other patterns including orthogonal picture elements in diagonal direction picture elements may be extracted as well. In this way, if a black region is sandwiched between two white regions, the black region is extracted and determined as a thin line image.

Figure 10:
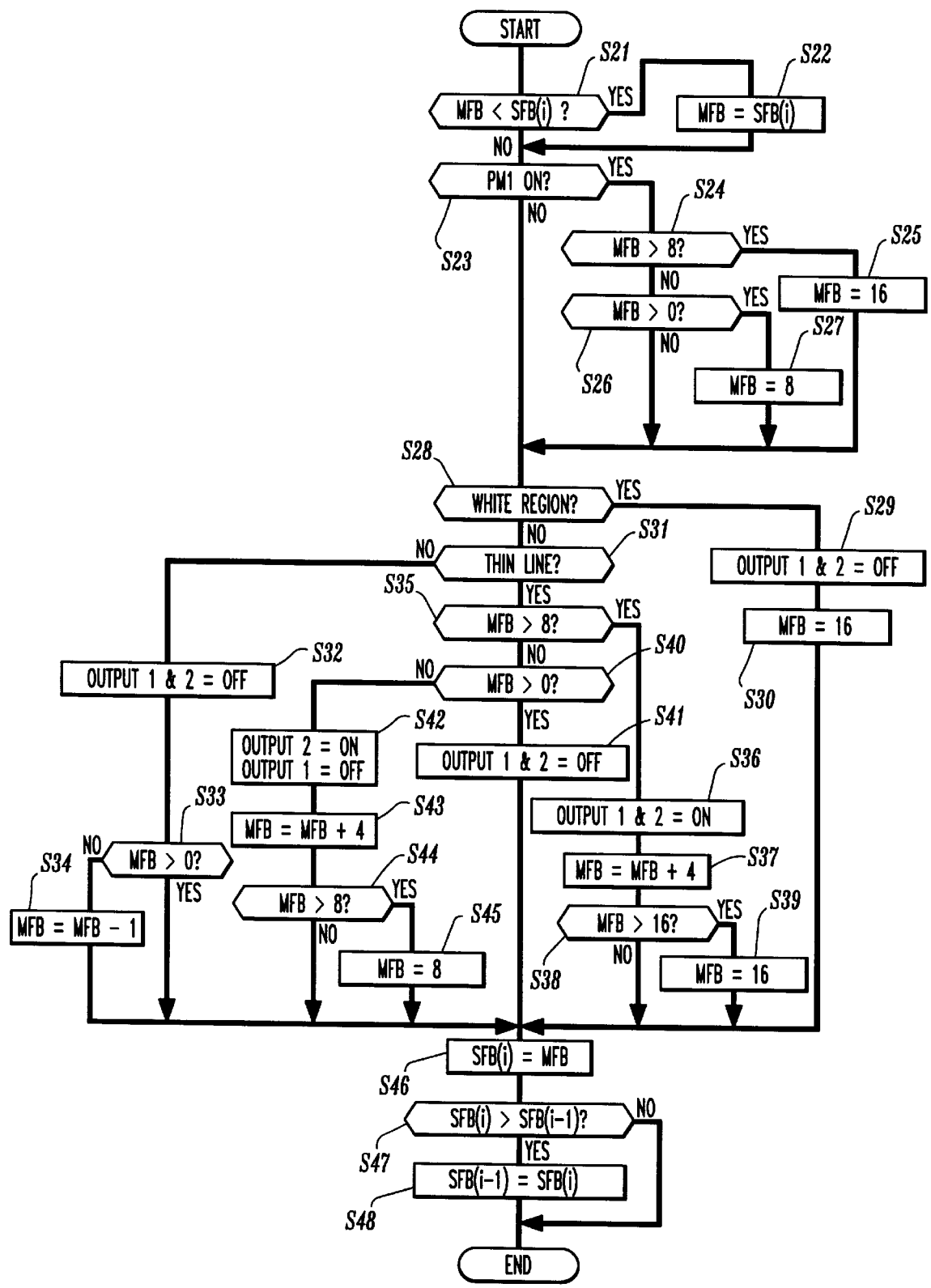

Next, a pattern matching operation by the pattern matching unit 305B is explained with reference to the flowchart shown in FIG. 10. A main scanning function block (MFB) presented in the flowchart is a conditional variant and is 0 at the top end of the main scanning motion. A sub-scanning function block (SFB(i)) presented in the flowchart is a conditional variant that represents a layout of the previous main scanning line. In step S21, the pattern matching unit 305B compares MFB representing the present condition and SFB(i) presenting the previous condition. If the result of the inequality MFB<SFB(i) is YES, the pattern matching unit 305B sets MFB equal to SFB(i) in step S22 and proceeds to step S23. If the result of the inequality MFB<SFB(i) is NO, the pattern matching unit 305B proceeds to step S23.

In step S23, the pattern matching unit 305B determines whether the PM1 output from the pattern matching unit 305A is H. When PM1 is not H and the result of step S23 is NO, the pattern matching unit 305B proceeds to step S28. If PM1 is H and the result of step S23 is YES, the pattern matching unit 305B proceeds to step S24 and determines whether MFB is greater than 8. If MFB is greater than 8, MFB is set to 16 in step S25 and then proceeds to step S28. If MFB is not greater than 8, the pattern matching unit 305B further determines whether MFB is greater than 0 in step S26. If MFB is greater than 0, MFB is set to 8 in step A27 and then proceeds to step S28. If MFB is not greater than 0, the pattern matching unit 305B proceeds to step S28.

In step S28, the pattern matching unit 305B determines whether a target region is a white region. In this case, the target region may be determined as a white region when a white region for a thin line image output from the Laplacian unit 304 is defined as "a" and the following conditions are satisfied:

$a_{00}$ and $a_{01}$ and $a_{02}$ and $a_{10}$ and $a_{11}$ and $a_{12}$ and $a_{20}$ and $a_{21}$ and $a_{22}$.

If the target region is determined as a white region in step S28, the pattern matching unit 305B outputs off signals at output ports 1 and 2 in step S29 and sets MFB to 16 in step S30. Then, the pattern matching unit 305B proceeds to step S46.

If the target region is not determined as a white region in step S28, the pattern matching unit 305B proceeds to step S31 and further determines whether the target region matches with the above-mentioned thin line pattern. If the target region is not matched with the thin line pattern, the pattern matching unit 305B outputs off signals at output ports 1 and 2 in step S32 and further proceeds to step S33. In step S33, the pattern matching unit 305B determines whether MFB is equal to 0. If MFB is equal to 0, the pattern matching unit 305B proceeds to step S46. If MFB is not equal to 0, the pattern matching unit 305B subtract one from MFB in step S34 and proceeds to step S46.

If the target region is matched with the thin line pattern and the result of step S31 is YES, the pattern matching unit 305B proceeds to step S35 and further determines whether MFB is greater than 8. If MFB is greater than 8, the pattern matching unit 305B outputs on signals at output ports 1 and 2 in step S36 and, in step S37, adds 4 to MFB. Then, the pattern matching unit 305B proceeds to step S38 and determines whether MFB is greater than 16. If MFB is greater than 16 in step S38, the pattern matching unit 305B sets MFB to 16 in step S39. If MFB is not greater than 16, the pattern matching unit 305B proceeds to step S46.

If MFB is not greater than 8 and the result of step S35 is NO, the pattern matching unit 305B proceeds to step S40 and determines whether MFB is equal to 0. If MFB is equal to 0, the pattern matching unit 305B outputs off signals at output ports 1 and 2 in step S41 and proceeds-to step S46. If MFB is not equal to 0, the pattern matching unit 305B outputs an off signal at output port 1 and an on signal at output port 2 in step S42 and, in step S43, adds 4 to MFB. In step S43, if MFB is greater than 16, the pattern matching unit 305B adds 16 to MFB. Then, the pattern matching unit 305B further proceeds to step S44 and determines whether MFB is greater than 8. If MFB is greater than 8, the pattern matching unit 305B sets MFB to 16 in step S45. If MFB is not greater than 8, the pattern matching unit 305B proceeds to step S46.

In step S46, the pattern matching unit 305B sets SFB(i) to MFB so as to update the previous line condition. Then, in step S47, the pattern matching unit 305B determines whether SFB(i) is greater than SFB(i−1) or whether the data of the updated previous line is greater than the previous picture element data of the updated previous line. If SFB(i) is greater than SFB(i−1), the pattern matching unit 305B proceeds to step S48 and sets SFB(i−1) to SFB(i). Then, the pattern matching unit 305B ends the operation. If SFB(i) is not greater than SFB(i−1), the pattern matching unit 305B ends the operation.

Figure 11:
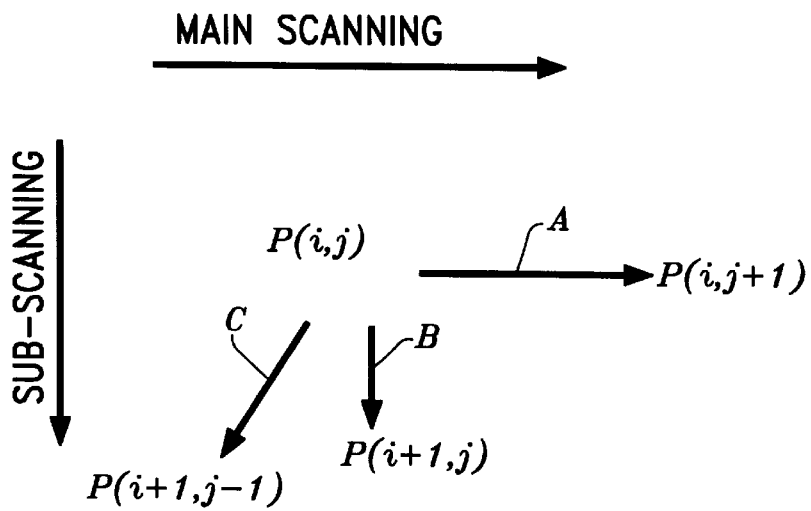
FIG. 11 is an illustration for showing movement of a conditional variant MFB during the pattern matching operation of FIG. 10.

The above-mentioned procedure is performed in turn during the main scanning and then the sub-scanning operations, as shown in FIG. 11. More specifically, the conditional variant MFB moves towards P(i, j+1) in the direction indicated by arrow A in FIG. 11. Then, at step S46, MFB turns its movement towards P(i+1, j) in the direction indicated by arrow B in FIG. 11. Further, MFB turns its movement towards P(i+1, j−1) in the direction indicated by arrow C in FIG. 11. By the thus-arranged operation, the conditional variants can be set to predetermined values through a process of determining whether the target region is matched with the thin line image pattern in step S23 or determining whether the target region is the white region in step S28, so that a thin line image on a white background can easily be extracted. As a result, an error in which a mesh pattern or patterns is extracted as a thin line image can be avoided. Moreover, the conditional variants may be reset by performing the pattern matching operation in step S31 and, accordingly, a group of alphanumeric symbols may be finely determined and extracted.

In addition, since the pattern matching unit 305B is arranged to output different signals at its output ports 1 and 2 depending on the conditional variant, alphanumeric symbols on a white background and on mesh patterns can be separately output.

The above-mentioned operation has an advantage in which a page-length memory or the like may not be needed for this particular purpose, and only a memory for storing one-line conditional variants and required line memories for performing pattern matching sufficient because the above-mentioned processing processes line by line and, therefore, does not require a page-length memory or the like.

The pattern matching unit 305B sends outputs 1 and 2 to the isolated point cleaning units 306A and 306B, respectively, as shown in FIG. 3.

Figure 12:
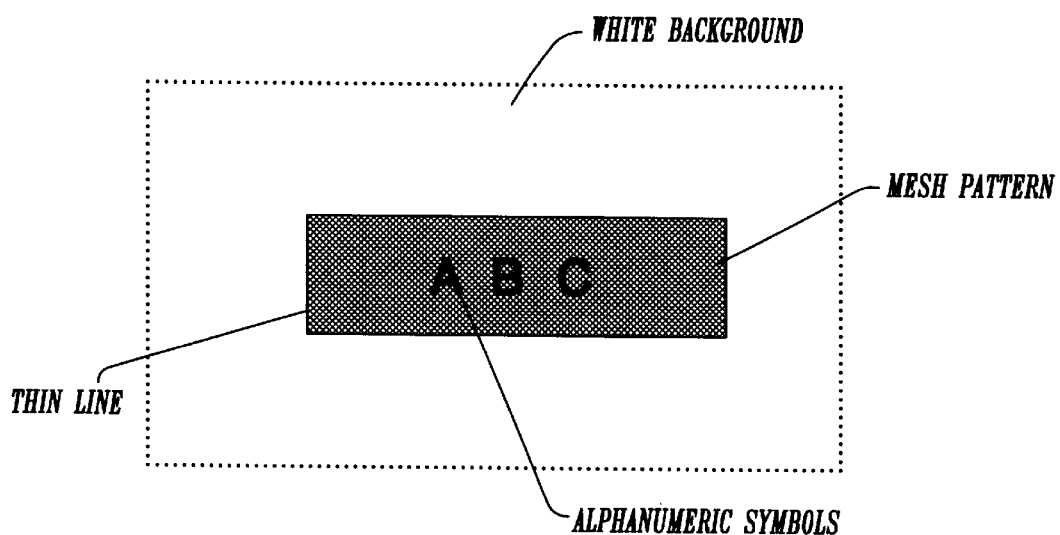
FIG. 12 is an example of a print pattern including line segments, alphanumeric symbols, and a mesh pattern.

One difference between outputs 1 and 2 is the different conditional variants contained in these signals. As an example, when an image including alphanumeric symbols, such as ABC, for example, as shown in FIG. 12, on thin lines made of a mesh pattern, the pattern matching unit 305B recognizes the thin lines and outputs the same signals, representing the thin lines, to the outputs 1 and 2. However, the alphanumeric symbols are handled differently by the pattern matching unit 305B in this case. The pattern matching unit 305B sends signals representing alphanumeric symbols with different grades of conditional variants to outputs 1 and 2. For example, output 2 transmits conditional variants greater than that of output 1 and, therefore, alphanumeric symbols can be recognized by using a signal of output 2.

Next, the isolated point cleaning units 306A and 306B, shown in FIG. 3, are explained. Each of these units 306A and 306B includes a circuit equivalent to that of the other. As shown in FIG. 3, the isolated point cleaning unit 306A receives PM1 from the pattern matching unit 305A and output 1 from the pattern matching unit 305B, and the isolated point cleaning unit 306B receives PM1 from the pattern matching unit 305A and output 2 from the pattern matching unit 305B. Isolated points may occur when a mesh pattern is mistakenly recognized as a part of a line image, and that can be eliminated from the line image by nature of the fact that the line image is made of a continuous line by using the isolated point cleaning units 306A and 306B.

When either one of the pattern matching units 305A and 305B extracts a pattern, an operation of cleaning isolated points is performed by the isolated points cleaning units 306A and 306B. For example, when more than two patterns, including isolated points, are extracted using a 4×4 pattern matching matrix, the isolated points cleaning units 306A and 306B correct the extracted patterns so that a center picture element (a22 or a33, for example) becomes a corrected extracted pattern. In this way, isolated points can be cleaned off and, at the same time, the space gap made by cleaning is filled. As a result, the isolated point cleaning units 306A and 306B sends the thus-extracted pattern signals as outputs PM2 and PM3, as shown in FIG. 3.

Next, the picture element density conversion units 307A and 307B shown in FIG. 3 are explained. Each of the units 307A and 307B includes a circuit equivalent to that of the other. Although the image data is handled in units of picture elements or points by the isolated point cleaning units 306A and 306B, the picture element density conversion units 307A and 307B converts the image data from units of picture elements into units of blocks of picture elements, so that the line image recognition unit 301 can handle image data divided into units of blocks of 4×4 picture elements, for example. In this case, the picture element density conversion units 307A and 307B performs conversion by simply cutting off the image data into a unit of a block of 4×4 picture elements. Since the isolated point cleaning units 306A and 306B fills any cleaned data area, no data loss occurs.

Next, the page memories 308A and 308B, and also the page memory 313 of the color determination unit 302 shown in FIG. 3 are explained. Each of these three memory circuits performs a function equivalent to that of the other. As shown in FIG. 3, the page memories 308A, 308B, and 313 receive outputs from the picture element density conversion unit 307A, the picture element density conversion unit 307B, and the color determination circuit 312, respectively.

Each of the page memories 308A, 308B, and 313 includes approximately 2 MB of memory capacity into which a page of 1200 dots in the main scanning direction and 1736 lines in the sub-scanning direction is structured. An area larger than an A-sized sheet and a double-letter-sized sheet, both of which have a resolution of 16 dots per mm both in the main scanning and sub-scanning directions, can be stored in the thus-arranged memory.

The page memories 308A, 308B, and 313 store input data, which is read during the first scanning operation of four scanning operations, by unit of a block of 4×4 picture elements. At the same time, the same input data are sent to selectors 309A, 309B, and 314, respectively. During the second and successive scanning operations, determination results, which are made for the input data read during the first scanning operation and which are stored in the page memories 308A, 308B, and 313, are applied to the selectors 309A, 309B, and 314. As a result, color determination results and processed data of the extracted line image made during the first scanning operation are also used during the second and successive scanning operations. Accordingly, variations in the results of color determination and extraction of line images by each scanning operation may be prevented.

Next, the isolated block cleaning units 310A and 310B shown in FIG. 3 are explained. Each of the units 310A and 310B includes a circuit and performs functions equivalent to that of the other. For example, when only a center block is in a high (H) state with all other surrounding blocks being in a low (L) state, the center block is defined as an isolated block. In th is case, the isolated block cleaning units 310A and 310B accordingly converts the state of the center block into the low (L) state. Thus, the isolated center block is prevented from being extracted.

Next, the expansion units 311A and 311B shown in FIG. 3 are explained. Each of the units 311A and 311B includes a circuit and performs a function equivalent to that of the other. As an example, the expansion units 311A and 311B perform operations of N×N OR logic processing, which is an expansion operation, and then M×M AND logic processing, which is a reduction operation. Then, the expansion units 311A and 311B perform 5×5 interpolation processing. In this case, the result of M−N is the amount of expansion by the above-mentioned operation by the expansion units 311A and 311B.

A relationship between N and M is N>M. The purpose of the N×M OR processing is to combine an isolated block with an adjacent block or surrounding blocks. An example of a 3×3 block expansion which corresponds to 12×12 picture elements is shown below:

$a_{00}$ or $a_{01}$ or $a_{02}$ or $a_{10}$ or $a_{11}$ or $a_{12}$ or $a_{20}$ or $a_{21}$ or $a_{22}$.

Then, 5×5 AND processing is performed. An example is shown below:

$a_{00}$ and $a_{01}$ and $a_{02}$ and $a_{03}$ and $a_{04}$ and $a_{10}$ and $a_{11}$ and $a_{12}$ and $a_{13}$ and $a_{14}$ and $a_{20}$ and $a_{21}$ and $a_{22}$ and $a_{23}$ and $a_{24}$ and $a_{30}$ and $a_{31}$ and $a_{32}$ and $a_{33}$ and $a_{34}$ and $a_{40}$ and $a_{41}$ and $a_{42}$ and $a_{43}$ and $a_{44}$.

Figure 13:
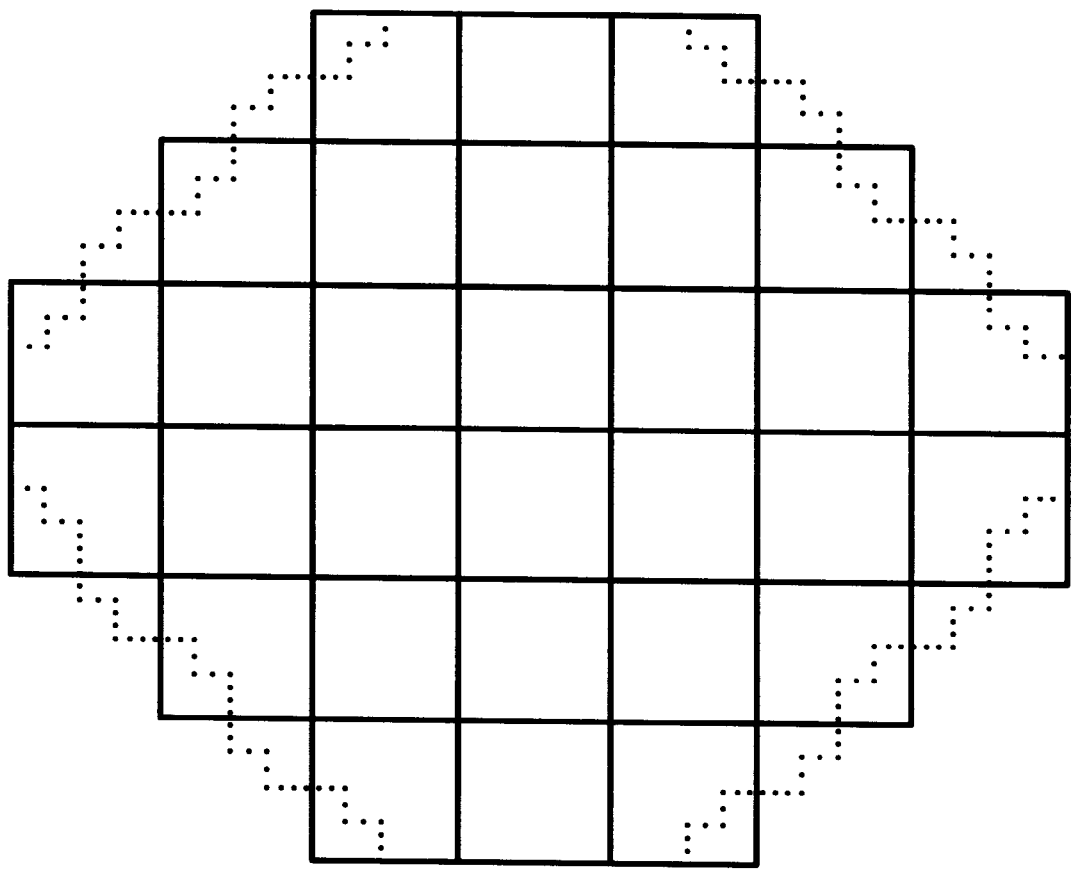
FIG. 13 is an illustration for explaining an interpolation operation for a region expanded by a line recognition unit.

Since a jagged line at 100 dpi (dots per inch) remains after performing the 5×5 AND processing, the interpolation operation is performed. An example of the interpolation operation is shown in FIG. 13. In FIG. 13, the solid line represents the jagged line at 100 dpi before correction, and the dotted line represents a corrected line. An example of the interpolation operation using 5×5 picture elements is shown below:

(pattern 1 and !pattern 2), or (pattern 3 and !pattern 4).

Patterns of this example, where represents an indeterminate operator, are further shown in detail below:

the pattern 1:
($a_{00}$ and $a_{02}$ and !$a_{04}$ and $a_{20}$ and $a_{22}$ and !$a_{24}$ and !$a_{40}$ and !$a_{42}$ and !$a_{44}$),
(!$a_{00}$ and $a_{02}$ and $a_{04}$ and !$a_{20}$ and $a_{22}$ and $a_{24}$ and !$a_{40}$ and !$a_{42}$ and !$a_{44}$),
(!$a_{00}$ and !$a_{02}$ and !$a_{04}$ and $a_{20}$ and $a_{22}$ and !$a_{24}$ and $a_{40}$ and $a_{42}$ and !$a_{44}$), or
(!$a_{00}$ and !$a_{02}$ and !$a_{04}$ and !$a_{20}$ and $a_{22}$ and $a_{24}$ and !$a_{40}$ and $a_{42}$ and $a_{44}$);

the pattern 2:
($a_{11}$ and $a_{12}$ and $a_{13}$ and $a_{21}$ and $a_{22}$ and $a_{23}$ and $a_{31}$ and $a_{32}$ and $a_{33}$);

the pattern 3:
(!$a_{00}$ and !$a_{02}$ and $a_{04}$ and !$a_{20}$ and !$a_{22}$ and $a_{24}$ and $a_{40}$ and $a_{42}$ and $a_{44}$),
($a_{00}$ and !$a_{02}$ and !$a_{04}$ and $a_{20}$ and !$a_{22}$ and !$a_{24}$ and $a_{40}$ and $a_{42}$ and $a_{44}$),
($a_{00}$ and $a_{02}$ and $a_{04}$ and !$a_{20}$ and !$a_{22}$ and $a_{24}$ and !$a_{40}$ and !$a_{42}$ and $a_{44}$), or
($a_{00}$ and $a_{02}$ and $a_{04}$ and $a_{20}$ and !$a_{22}$ and !$a_{24}$ and $a_{40}$ and !$a_{42}$ and !$a_{44}$); and the pattern 4:
(!$a_{11}$ and !$a_{12}$ and !$a_{13}$ and !$a_{21}$ and !$a_{22}$ and !$a_{23}$ and !$a_{31}$ and !$a_{32}$ and !$a_{33}$).

The expansion units 311A and 311B correct jagged lines and connect a cross point between alphanumeric symbols by expansion in the above-mentioned way. Connection of a cross point between alphanumeric symbols, which is not performed by the aforesaid pattern matching units 305A and 305B, are performed by the expansion units 311A and 311B. In addition, a line image and its surrounding regions are taken as the line image so that processing of alphanumeric symbols in black with a space filter can be effectively performed.

By the above-mentioned way, the novel image processing apparatus 100 can extract line segments with a superior quality, including line segments on a mesh pattern. Such line segments are often seen in product catalogs where performances are listed in a highlighted manner with a mesh pattern in a line box, for example. Specifically, the novel image processing apparatus 100 can extract line segments including white regions as alphanumeric symbols. For example, a Chinese letter, "日", in a mesh pattern may clearly be extracted. Further, the novel image processing apparatus 100 outputs a determination result of alphanumeric symbols of any language, including the above-mentioned Chinese example, in a manner different from that of alphanumeric symbols on the white background. As a result, the novel image processing apparatus 100 distinguishes between alphanumeric symbols on a mesh pattern and those on a white background in processing these two types of symbols.

Next, an explanation is made of a modified embodiment of the above-mentioned novel image processing apparatus 100 according to the present invention. The modified novel image processing apparatus includes the same set of units included in the novel image processing apparatus 100, except for the pattern matching unit 305B of the line image recognition unit 301. The pattern matching unit 305B in the modified novel image processing apparatus is arranged to have different output conditions from that of the novel image processing apparatus 100. The difference is explained below.

The modified novel image processing apparatus performs an improved pattern matching by which complex alphanumeric symbols or busy line segments on a mesh pattern can be extracted. The improved pattern matching is made possible by having additional conditions to the variant conditions of output 2 of the pattern matching unit 305B.

An operation of the improved pattern matching in the modified novel image processing apparatus is now explained with reference to the flowchart shown in FIG. 14. The flowchart of FIG. 14 partly includes portions similarly presented in the flowchart of FIG. 10. Therefore, the following explanation of the flowchart of FIG. 14 is limited only to portions different from the flowchart of FIG. 10.

Figure 14:
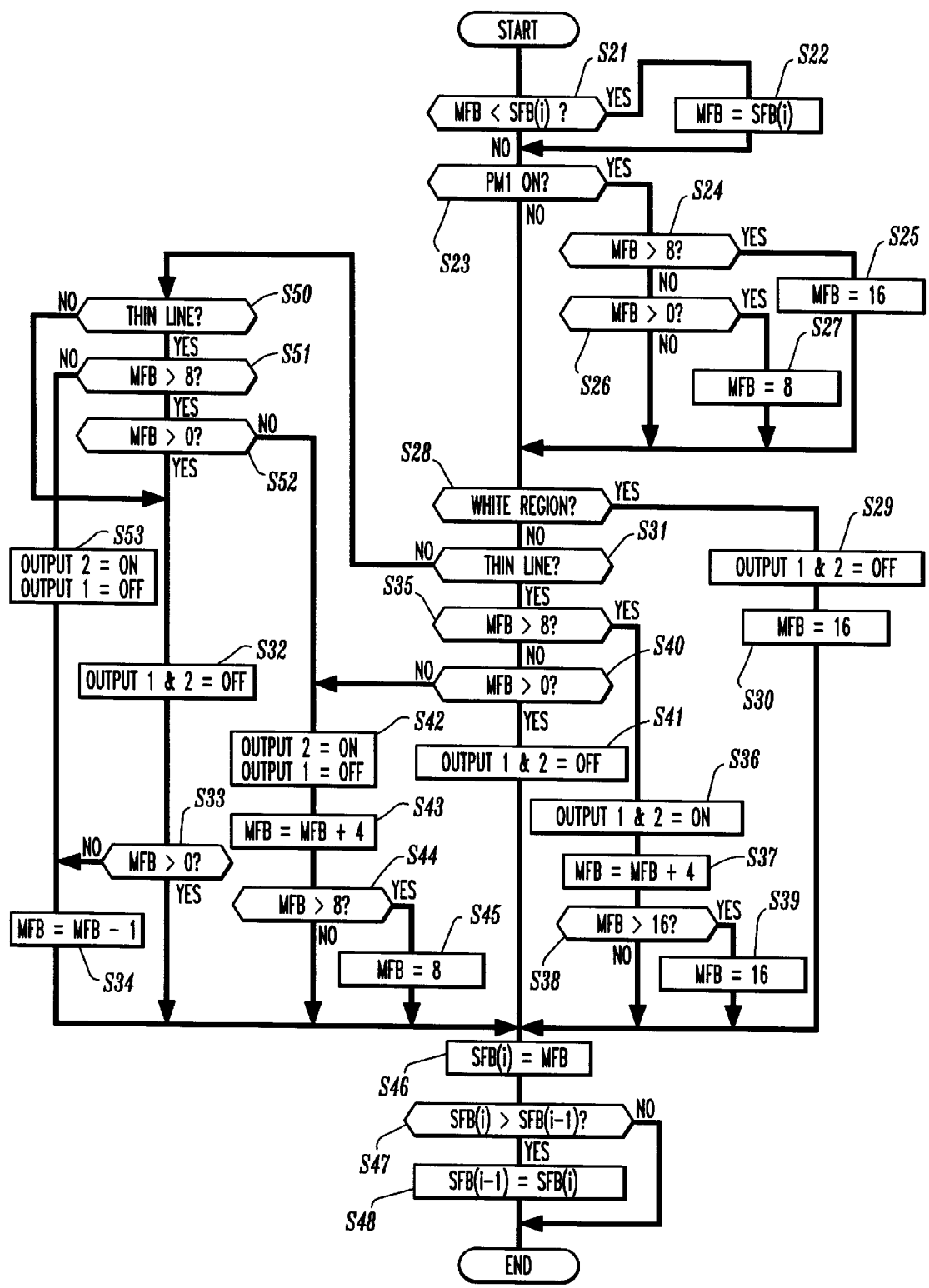
FIG. 14 is a flowchart for explaining a pattern matching operation according to another embodiment of the novel image processing apparatus.

In step S31 of the flowchart in FIG. 14, the pattern matching unit 305B determines whether the target region is matched with the aforementioned thin line pattern. When the target region is not matched with the thin line pattern, the pattern matching unit 305B proceeds to step S50 and determines whether the target region is matched with a thin line pattern 1, which is explained below.

The thin line pattern 1 used in this embodiment may be the same as the above-mentioned thin line pattern but is not limited to it. In this case, black regions or edge amounts greater than the threshold thb (FIG. 6) are extracted as H for the black pattern (k). Also, white regions for thin lines or edge amounts greater than threshold thw (FIG. 6) are extracted as H for the white pattern (w). In this case, an edge amount is a minus factor and its absolute value is actually larger than thw. In this way, a correction is made on edge amounts so as to improve the contrast of thin lines. In the pattern matching operation using the thin line pattern 1, at least one of thb and thw is preferably set to a value by which extraction can be made easier than the case using the thin line pattern. When patterns of the thin line pattern and thin line pattern 1 differ, the pattern matching operation is set such that extraction using the thin line pattern is easier than that using the thin line pattern 1.

If the target region is not matched with the thin line pattern 1 and the result of step S50 is NO, the pattern matching unit 305B outputs off signals at output ports 1 and 2 in step S32 and proceeds to step S33. In step S33, the pattern matching unit 305B determines whether MFB is equal to 0. If MFB is equal to 0, the pattern matching unit 305B proceeds to step S46. If MFB is not equal to 0, the pattern matching unit 305B subtracts one from MFB and proceeds to step S46.

If the target region is matched with the thin line pattern 1 and the result of step S50 is YES, the pattern matching unit 305B proceeds to step S51 and determines whether MFB is greater than 8. If MFB is greater than 8, the pattern matching unit 305B outputs an off signal at output ports 1 and an on signal at output port 2 in step S53 and proceeds to step S34. Then, the pattern matching unit 305B subtracts one from MFB in step S34 and proceeds to step S46.

If MFB is not greater than 8 and the result of step S51 is NO, the pattern matching unit 305B proceeds to step S52 and determines whether MFB is equal to 0. If MFB is not equal to 0, the pattern matching unit 305B proceeds to step S42, the effect of which is explained earlier in reference to FIG. 10. If MFB is equal to 0, the pattern matching unit 305B proceeds to step S32 and outputs off signals at output ports 1 and 2. Then, the pattern matching unit 305B proceeds to step S33 and again determines whether MFB is equal to 0. If MFB is equal to 0, the pattern matching unit 305B proceeds to step S46. If MFB is not 0, the pattern matching unit 305B subtracts one from MFB in step S34 and proceeds to step S46.

In the above-mentioned case, the aforementioned coding may advantageously be used to represent the thin line pattern, the thin line pattern 1, the threshold thw, and the threshold thb using their relative sizes. As an example, thw and thb for the thin line pattern are respectively defined as thw and thb. Also, thb and thw for thin line pattern 1 are respectively defined as thw1 and thb1. Further, a relationship between thw, thb, thw1, and thb1 is set to thw<thw1<thb1=thb. When coding is arranged in this way, the data length is two-bit x n-line as opposed to four-bit or three-bit x n-line for a non-coding case. The following is a coding example where P represents an edge amount: if P is less than thw, the code is 0; if thw is less than P and P is less than thw1, the code is 1; if thw1 is less than P and P is less than thb, the code is 2; and if thb is less than P, the code is 3. In addition, the size relationship mentioned above may be altered from time to time on a demand basis.

In this way, patterns on a white background and patterns on a mesh pattern and a color background can be distinguished by using the conditional variant MFB, which can be used commonly in the above-mentioned differently presented patterns. In addition, if alphanumeric symbols can be extracted with a superior quality in step S50, the pattern matching unit 305B may not need to refer to the conditional variant MFB in step S52 and may fix the determination result of step S52 as YES. Separation of alphanumeric symbols on a mesh pattern and alphanumeric symbols on a white background may be made in this way.

By the above-mentioned procedure, the modified novel image processing apparatus can extract busy line segments with a superior quality even when the busy line segments are on a mesh pattern. This case is often seen in product catalogs in which product performances are listed in a highlighted manner with a mesh pattern in a line box, for example. Specifically, the modified novel image processing apparatus can extract line segments including white regions as alphanumeric symbols. For example, a complex Chinese letter, "書", in a mesh pattern may clearly be extracted. Further, the modified novel image processing apparatus outputs a determination result of alphanumeric symbols of any language, including the above-mentioned Chinese example, in a manner different from that of alphanumeric symbols on a white background. As a result, the modified novel image processing apparatus distinguishes between alphanumeric symbols on a mesh pattern and those on a white background with improved accuracy in processing these two types of symbols.

In addition, with respect to the MFB movement shown in FIG. 11, in which three kinds of MFB movement are represented, P(i+1, j–2), P(i+1, j–3), and so on may preferably be added so as to eliminate a factor of MFB movement in the main scanning direction. Moreover, MFB movement may preferably be at all angles, or 360 degrees, in an image processing apparatus that can store all image data in a page memory.

Figure 15:
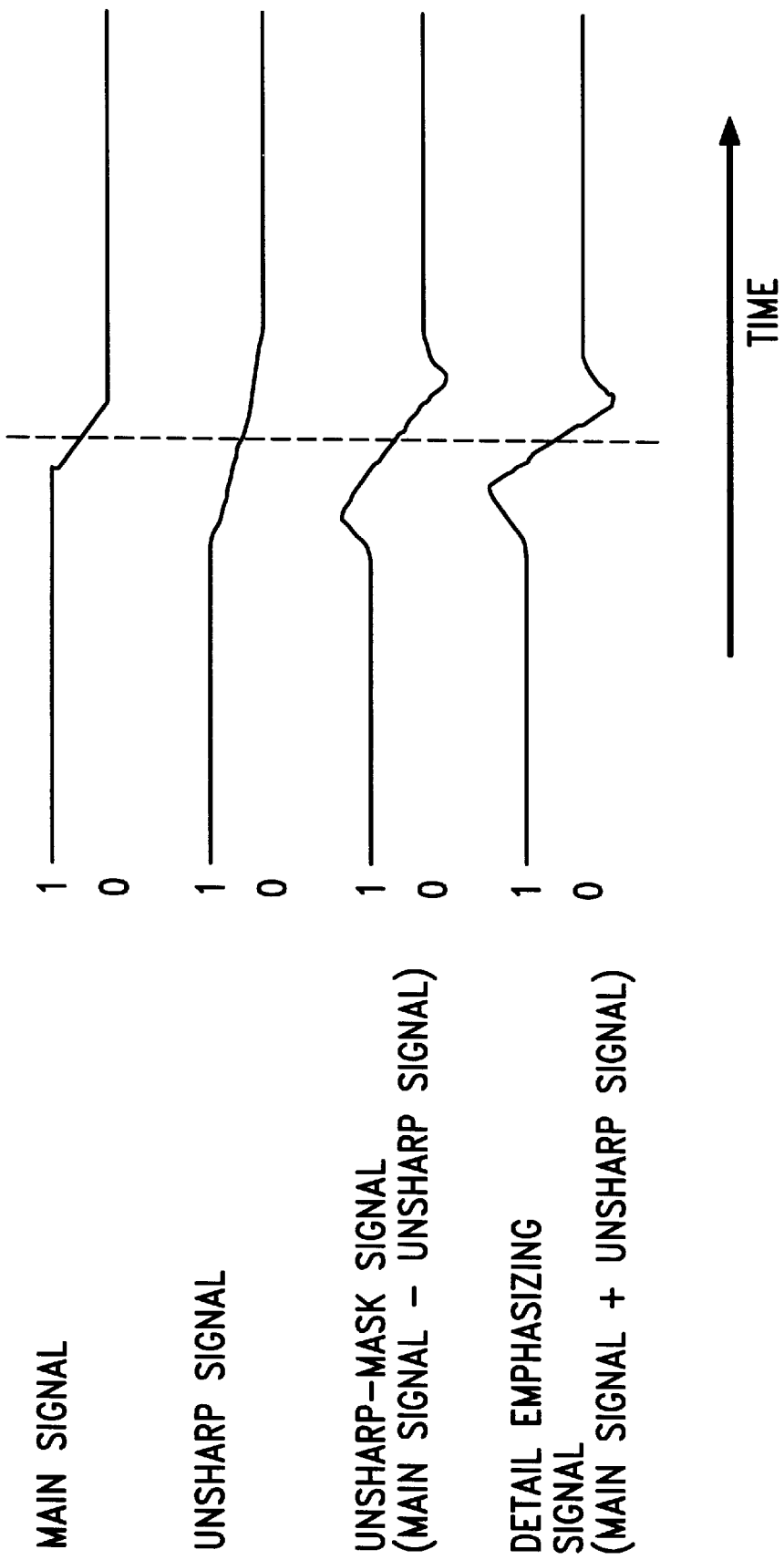
FIG. 15 is an illustration for explaining detail emphasizing effects in an unsharp masking.

A detail emphasizing effect produced by an unsharp masking method is explained with reference to FIG. 15. In FIG. 15, a target signal, an unsharp signal, an unsharp mask signal, and a detail emphasizing signal are shown. Edge correction is made on the basis of the exemplary edge characteristics of these signals. Alternatively, the edge correction may be made by using the detail emphasizing signal or the like even though the edge correction is made by using the unsharp signal in the Laplacian unit 304 in the two embodiments described herein below.

The pattern matching unit 305A does not extract alphanumeric symbols when extracting line segments on a white background. In this case, the pattern matching unit 305B separately extracts line segments on a white background and line segments on a mesh pattern or a color background. As an example of such extraction by the pattern matching unit 305B, a Chinese letter, "書", which is an example of a complex letter including busy line segments, can clearly be extracted.

The conditional variant MFB need not be limited to any value, even though in the above-mentioned embodiments MFB has an exemplary upper limit of 8 for alphanumeric symbols on a mesh pattern and 16 for alphanumeric symbols on a white background.

The purpose of the above-mentioned operation of distinguishing between alphanumeric symbols on a mesh pattern and those on a white background is to avoid an extraction of symbols in error, especially when busy line segments are on a mesh pattern. Specifically, the operation of such distinguishing uses a relationship between lines and symbols in which the probability of a symbol's existence increases with decreasing line thickness and decreases with increasing line thickness.

By the thus-arranged novel image processing apparatus 100 and modified novel image processing apparatus, various types of prints, such as small sized alphanumeric symbols, line images, and complex letters on a white background, and alphanumeric symbols on a mesh pattern, can be distinguished and separately extracted. Further, since no reverse MFB movement is arranged used in the sub-scanning operation, the invention can easily be implemented in a product that uses a simple raster-scanning reading method to facilitate handling of image data, for example.

The present invention may be used to produce a print copy from a printing material having a mesh pattern by using a copying machine that otherwise would produce no mesh pattern. This is because the present invention includes an algorithm for detecting a line edge and does not include an operation for detecting and removing a mesh pattern, which is a typical characteristic of printing materials.

As another feature, the present invention can discriminatory eliminate regions determined by mistake. This is because an extracted pattern is first examined by the isolated point cleaning operation in units of picture elements so that erroneous determination of a minimal size region can be eliminated. Then, the extracted pattern is examined by the isolated block cleaning operation in units of blocks of 4×4 picture elements. Further, the picture elements in block units are then reversibly converted into the original image density so that a cleaned image is provided with corrected small picture elements.

As still another feature of the present invention, the above-mentioned embodiments reduce the amount of memory necessary for storing images during an expansion operation. When the expansion units 311A and 311B perform a simple expansion, an isolated region may also be expanded, which is not desirable. The embodiments of the present invention expand the picture elements M by an expansion amount X and then reduce the picture elements N such that an equation X=M−N is set. As a result of reduction, an isolated point may be connected to a line because X is less than M. In this case, the expansion operation is performed in units of blocks of picture elements so that the amount of memory for storing image data can be reduced.

As still another feature, determination results of line images and color images for the image read by the first scanning operation are stored and used during the second and consecutive scanning operations. Therefore, no variation is caused in determination results of line images and color images for the image.

Alternative to the operation in which the determination results of line images and color images are stored in the page memories 308A and 308B, the determination result of, for example, line images may be stored in these memories and the determination result of color images can be newly performed for each scanning operation after the first scanning operation. In this way, the memory can be structured by two 2 MB memories so that a widely-popular 4 MB memory can be implemented. As a result, the novel image processing apparatus can reduce memory cost. Still further, the entire memory size can be set within the 4 MB memory capacity by implementing a 2 4MB memory for the page memory 308A and two 1 MB memories for the page memories 308B and 131. In this case, the page memories 308B and 131 use 8×4 blocks instead of 4×4 blocks. In this way, memory size can also be reduced.

Still further, instead of storing all determination results, only results having large variations resulted from each scanning operation can be selectively stored so that memory size can be reduced.

This invention may be conveniently implemented using a conventional general purpose digital computer programmed according to the teachings of the present specification, as will be apparent to those skilled in the computer arts. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What we claim is:

1. An image processing apparatus, comprising:
   converting means for converting analog image data into digital data;
   first determining means for determining a region as a white picture element region when said region includes a predetermined white picture element and a plurality of which picture elements surrounding said predetermined white picture element in said digital data;
   first conditional variant setting means for setting a conditional variant to white picture elements in said white picture element region;
   potential thin line extracting means for extracting a potential thin line pattern using a black picture element that has been corrected after being extracted from said digital data and a white picture element that has been corrected after being extracted from said digital data; and
   discriminating and renewing means for discriminating which one of an alphanumeric symbol on a white background, an alphanumeric symbol on a mesh pattern, and a design pattern is similar to said potential thin line pattern based on said conditional variant and said potential thin line pattern, and for renewing said conditional variant in accordance with a determination result determined by said discriminating and renewing means.

2. The image processing apparatus according to claim 1, further comprising second conditional variant setting means for setting said conditional variant when a black alphanumeric symbol on a white background is extracted.

3. The image processing apparatus according to claim 1, wherein said potential thin line extracting means extracts a potential thin line pattern with extraction conditions differentiated in accordance with said conditional variant.

4. The image processing apparatus according to claim 2, wherein said potential thin line extracting means extracts a potential thin line pattern with extraction conditions differentiated in accordance with said conditional variant.

5. The image processing apparatus according to claim 1, wherein said first determining means performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

6. The image processing apparatus according to claim 2, wherein said first determining means performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

7. The image processing apparatus according to claim 3, wherein said first determining means performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

8. The image processing apparatus according to claim 4, wherein said first determining means performs an image scanning operation in predetermined directions and said conditional variant moves sequentially in respective directions toward coordinates P(i, j+1), P(i+1, j), and P(i+1, j−1) relative to a target processing picture element having coordinates P(i, j).

9. The image processing apparatus according to claim 1, wherein said potential thin line extracting means corrects said black picture element and said white picture element using Laplacian data.

10. The image processing apparatus according to claim 2, wherein said potential thin line extracting means corrects said black picture element and said white picture element using Laplacian data.

11. The image processing apparatus according to claim 3, wherein said potential thin line extracting means corrects said black picture element and said white picture element using Laplacian data.

12. The image processing apparatus according to claim 4, wherein said potential thin line extracting means corrects said black picture element and said white picture element using Laplacian data.

13. The image processing apparatus according to claim 5, wherein said potential thin line extracting means corrects said black picture element and said white picture element using Laplacian data.

14. The image processing apparatus according to claim 6, wherein said potential thin line extracting means corrects said black picture element and said white picture element using Laplacian data.

15. The image processing apparatus according to claim 7, wherein said potential thin line extracting means corrects said black picture element and said white picture element using Laplacian data.

16. The image processing apparatus according to claim 8, wherein said potential thin line extracting means corrects said black picture element and said white picture element using Laplacian data.

17. The image processing apparatus according to claim 9, wherein said potential thin line extracting means varies extraction weights of the Laplacian data on the basis of at least one of a scanning speed and a magnification ratio.

18. The image processing apparatus according to claim 10, wherein said potential thin line extracting means varies extraction weights of the Laplacian data on the basis of at one of a scanning speed and a magnification ratio.

19. The image processing apparatus according to claim 11, wherein said potential thin line extracting means varies extraction weights of the Laplacian data on the basis of at one of a scanning speed and a magnification ratio.

20. The image processing apparatus according to claim 12, wherein said potential thin line extracting means varies extraction weights of the Laplacian data on the basis of at one of a scanning speed and a magnification ratio.

21. The image processing apparatus according to claim 13, wherein said potential thin line extracting means varies extraction weights of the Laplacian data on the basis of at one of a scanning speed and a magnification ratio.

22. The image processing apparatus according to claim 14, wherein said potential thin line extracting means varies extraction weights of the Laplacian data on the basis of at one of a scanning speed and a magnification ratio.

23. The image processing apparatus according to claim 15, wherein said potential thin line extracting means varies extraction weights of the Laplacian data on the basis of at one of a scanning speed and a magnification ratio.

24. The image processing apparatus according to claim 16, wherein said potential thin line extracting means varies extraction weights of the Laplacian data on the basis of at one of a scanning speed and a magnification ratio.

25. An image processing apparatus, comprising:
a converter for converting analog image data into digital data;
a first determiner for determining a region as a white picture element region when said region includes a predetermined white picture element and a plurality of white picture elements surrounding said predetermined white picture element in said digital data;
a first conditional variant setter for setting a conditional variant to white picture elements in said white picture element region;
a potential thin line extractor for extracting a potential thin line pattern using a black picture element that has been corrected after being extracted from said digital data and a white picture element that has been corrected after being extracted from said digital data; and
a second determiner for determining which one of an alphanumeric symbol on a white background, an alphanumeric symbol on a mesh pattern, and a design pattern is similar to said potential thin line pattern based on said conditional variant and said potential thin line pattern, and for renewing said conditional variant based on a determination result of said second determiner.

26. The image processing apparatus according to claim 25, further comprising a second conditional variant setter for setting said conditional variant when a black alphanumeric symbol on a white background is extracted.

27. The image processing apparatus according to claim 25, wherein said potential thin line extractor extracts a potential thin line pattern with extraction conditions differentiated in accordance with said conditional variant.

28. The image processing apparatus according to claim 26, wherein said potential thin line extractor extracts a potential thin line pattern with extraction conditions differentiated in accordance with said conditional variant.

29. The image processing apparatus according to claim 25, wherein said first determiner performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

30. The image processing apparatus according to claim 26, wherein said first determiner performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

31. The image processing apparatus according to claim 27, wherein said first determiner performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

32. The image processing apparatus according to claim 28, wherein said first determiner performs an image scanning operation in predetermined directions, and said conditional variant moves sequentially in respective directions toward coordinates P(i, j+1), P(i+1, j), and P(i+1, j−1) relative to a target processing picture element having coordinates P(i, j).

33. The image processing apparatus according to claim 25, wherein said potential thin line extractor corrects said black picture element and said white picture element using Laplacian data.

34. The image processing apparatus according to claim 26, wherein said potential thin line extractor corrects said black picture element and said white picture element using Laplacian data.

35. The image processing apparatus according to claim 27, wherein said potential thin line extractor corrects said black picture element and said white picture element using Laplacian data.

36. The image processing apparatus according to claim 28, wherein said potential thin line extractor corrects said black picture element and said white picture element using Laplacian data.

37. The image processing apparatus according to claim 29, wherein said potential thin line extractor corrects said black picture element and said white picture element using Laplacian data.

38. The image processing apparatus according to claim 30, wherein said potential thin line extractor corrects said black picture element and said white picture element using Laplacian data.

39. The image processing apparatus according to claim 31, wherein said potential thin line extractor corrects said black picture element and said white picture element using Laplacian data.

40. The image processing apparatus according to claim 32, wherein said potential thin line extractor corrects said black picture element and said white picture element using Laplacian data.

41. The image processing apparatus according to claim 33, wherein said potential thin line extractor varies extraction weights of the Laplacian data on the basis of at least one of a scanning speed and a magnification ratio.

42. The image processing apparatus according to claim 34, wherein said potential thin line extractor varies extraction weights of the Laplacian data on the basis of at one of a scanning speed and a magnification ratio.

43. The image processing apparatus according to claim 35, wherein said potential thin line extractor varies extraction weights of the Laplacian data on the basis of at one of a scanning speed and a magnification ratio.

44. The image processing apparatus according to claim 36, wherein said potential thin line extractor varies extraction weights of the Laplacian data on the basis of at one of a scanning speed and a magnification ratio.

45. The image processing apparatus according to claim 37, wherein said potential thin line extractor varies extraction weights of the Laplacian data on the basis of at one of a scanning speed and a magnification ratio.

46. The image processing apparatus according to claim 38, wherein said potential thin line extractor varies extraction weights of the Laplacian data on the basis of at one of a scanning speed and a magnification ratio.

47. The image processing apparatus according to claim 39, wherein said potential thin line extractor varies extraction weights of the Laplacian data on the basis of at one of a scanning speed and a magnification ratio.

48. The image processing apparatus according to claim 40, wherein said potential thin line extractor varies extraction weights of the Laplacian data on the basis of at one of a scanning speed and a magnification ratio.

49. An image processing method, comprising the steps of:

converting analog image data into digital data;

determining a region as a white picture element region when said region includes a predetermined white picture element and a plurality of white picture elements surrounding said predetermined white picture element in said digital data;

setting a conditional variant to white picture elements in said white picture element region;

extracting a potential thin line pattern using a black picture element that has been corrected after being extracted from said digital data and a white picture element that has been corrected after being extracted from said digital data;

discriminating which one of an alphanumeric symbol on a white background, an alphanumeric symbol on a mesh pattern, and a design pattern is similar to said potential thin line pattern based on said conditional variant and said extracted potential thin line pattern; and renewing said conditional variant in accordance with a result of said step of discriminating.

* * * * *